United States Patent
Karkra et al.

(10) Patent No.: US 12,386,564 B2
(45) Date of Patent: Aug. 12, 2025

(54) REDUCING WRITE AMPLIFICATION AND OVER-PROVISIONING USING FLASH TRANSLATION LAYER SYNCHRONIZATION

(71) Applicant: Intel Corporation, Santa Clara, CA (US)

(72) Inventors: Kapil Karkra, Chandler, AZ (US);
Wojciech Malikowski, Gdansk (PL);
Mariusz Barczak, Gdansk (PL);
Shirish Bahirat, Longmont, CO (US)

( * ) Notice: Subject to any disclaimer, the term of this patent is extended or adjusted under 35 U.S.C. 154(b) by 251 days.

(21) Appl. No.: 17/979,687

(22) Filed: Nov. 2, 2022

(65) Prior Publication Data
US 2023/0051806 A1   Feb. 16, 2023

(51) Int. Cl.
*G06F 3/06*   (2006.01)

(52) U.S. Cl.
CPC .......... *G06F 3/0665* (2013.01); *G06F 3/0607* (2013.01); *G06F 3/0679* (2013.01)

(58) Field of Classification Search
CPC .... G06F 3/0604; G06F 3/0607; G06F 3/0631; G06F 3/0665; G06F 3/0679; G06F 12/0246; G06F 2212/7201
See application file for complete search history.

(56) References Cited

U.S. PATENT DOCUMENTS

| | | | |
|---|---|---|---|
| 10,592,408 B2 | 3/2020 | Li et al. | |
| 10,860,228 B1* | 12/2020 | Mulani | G06F 3/0658 |
| 2013/0166826 A1* | 6/2013 | Franceschini | G06F 12/0246 |
| | | | 711/E12.008 |
| 2018/0121344 A1* | 5/2018 | Seo | G06F 12/0246 |
| 2022/0404966 A1* | 12/2022 | Kanno | G06F 3/0619 |

OTHER PUBLICATIONS

Malikowski, Storage Performance Development Kit (SPDK) Flash Translation Layer Library for Zoned Namespace SSDs, Aug. 6, 2019, Flash Memory Summit (Year: 2019).*
Yang, Jingpei, et al., "Don't stack your Log on my Log", SanDisk Corporation, Inflow'14, 2nd Workshop on Interactions of NVM/Flash with Operating Systems and Workloads, held Oct. 5, 2014, Broomfield, CO, USA., 10 pages.

\* cited by examiner

*Primary Examiner* — Larry T Mackall
(74) *Attorney, Agent, or Firm* — Haley Guiliano LLP

(57) ABSTRACT

A host Flash Translation Layer (FTL) synchronizes host FTL operations with the drive FTL operations to reduce write amplification and over-provisioning. Embodiments of FTL synchronization map, at the host FTL software (SW) stack level, logical bands in which data is managed, referred to as host bands, to the physical bands on a drive where data is stored. The host FTL tracks validity levels of data managed in host bands to determine validity levels of data stored in corresponding physical bands, and optimizes defragmentation operations (such as garbage collection processes and trim operations) applied by the host FTL SW stack to the physical bands based on the tracked validity levels.

17 Claims, 20 Drawing Sheets

REDUCING WRITE AMPLIFICATION AND OVER-PROVISIONING USING FLASH TRANSLATION LAYER SYNCHRONIZATION

TECHNICAL FIELD

Embodiments described herein generally relate to an apparatus, computer program product, system, and method for managing data stored in memory devices, particularly NAND devices.

BACKGROUND

Memory and storage devices are commonly used in computing systems for data storage and retrieval. To store and retrieve large amounts of data, servers and data centers in cloud computing or edge computing environments typically include solid state storage drives (SSDs) that use a non-volatile memory (NVM) Flash memory architecture (Flash) such as NAND (Negated "AND") Flash memory components or devices.

Because NAND Flash memory must be erased before new data can be written, SSDs that use NAND Flash memory as storage will have some data write amplification. Write amplification occurs when extra NAND operations are needed to move existing data, often more than once. These extra NAND operations produce a multiplying effect that increases the number of writes required, resulting in an "amplification" factor; hence the term "write amplification." The write amplification factor (WAF) constantly changes over the life of the SSD.

Write amplification has many implications for the read/write performance and the reliability of the SSD. Depending on the SSD's intelligence in managing its data, write amplification can cause extra wear and extra read/write/erase cycles on the NAND components reducing the life of the NAND Flash component. An SSD's intelligence includes an on-drive Flash Translation Layer (FTL), typically implemented in the SSD firmware, which is designed to, among other things, reduce the amount of write amplification. In addition, an SSD is often "over-provisioned" with dedicated additional capacity to account for the extra read/write/erase cycles. Over-provisioned SSDs waste resources that could otherwise be used to increase storage capacity.

BRIEF DESCRIPTION OF THE DRAWINGS

Features of embodiments of the claimed subject matter will become apparent as the following detailed description proceeds, and upon reference to the drawings, in which like numerals depict like parts, and in which:

DETAILED DESCRIPTION

To scale storage performance and storage capacity, some storage architectures include a host-based FTL (hereafter host FTL), typically implemented in a software (SW) stack, to manage write shaping, caching, data sequentialization and other operations designed to reduce write amplification. For example, a write shaping framework that sequences data using a host FTL SW stack on top of an on-drive FTL (hereafter referred to as a drive FTL) of a standard NAND SSD can artificially make a random workload look like sequential workload by absorbing write amplification at the host FTL SW stack.

Unfortunately, stacking a host FTL on top of one or more drive FTLs can have the unintended consequence of increasing write amplification instead of reducing write amplification for reasons that will be detailed in the description that follows.

To address this challenge, embodiments of FTL synchronization synchronize the host FTL operations with the drive FTL operations. Among other aspects, embodiments of FTL synchronization map, at the host FTL SW stack level, logical bands in which data is managed, referred to as host bands, to the physical bands on a drive where data is stored.

Among other information, embodiments of FTL synchronization are based in part on determining data validity levels. In NVM Flash devices, data is typically marked as valid or no longer valid by logical block address (LBA) as maintained in a logical-to-physical address table (L2P table). A host band validity level is typically expressed as a percentage of data managed in the host bands that is still valid. The validity level typically decreases over time as more of the data gets erased or deleted from the physical band where it was stored, or is otherwise no longer valid.

In one embodiment FTL synchronization tracks host band validity levels of data managed in host bands. The host band validity levels of data managed in host bands allows the host FTL SW stack to indirectly determine validity levels of data stored in corresponding physical bands as will be described in further detail below. In this manner, FTL synchronization can optimize defragmentation operations (such as garbage collection processes and trim operations) applied by the host FTL SW stack to the physical bands based on the tracked host band validity levels.

Figure 1:
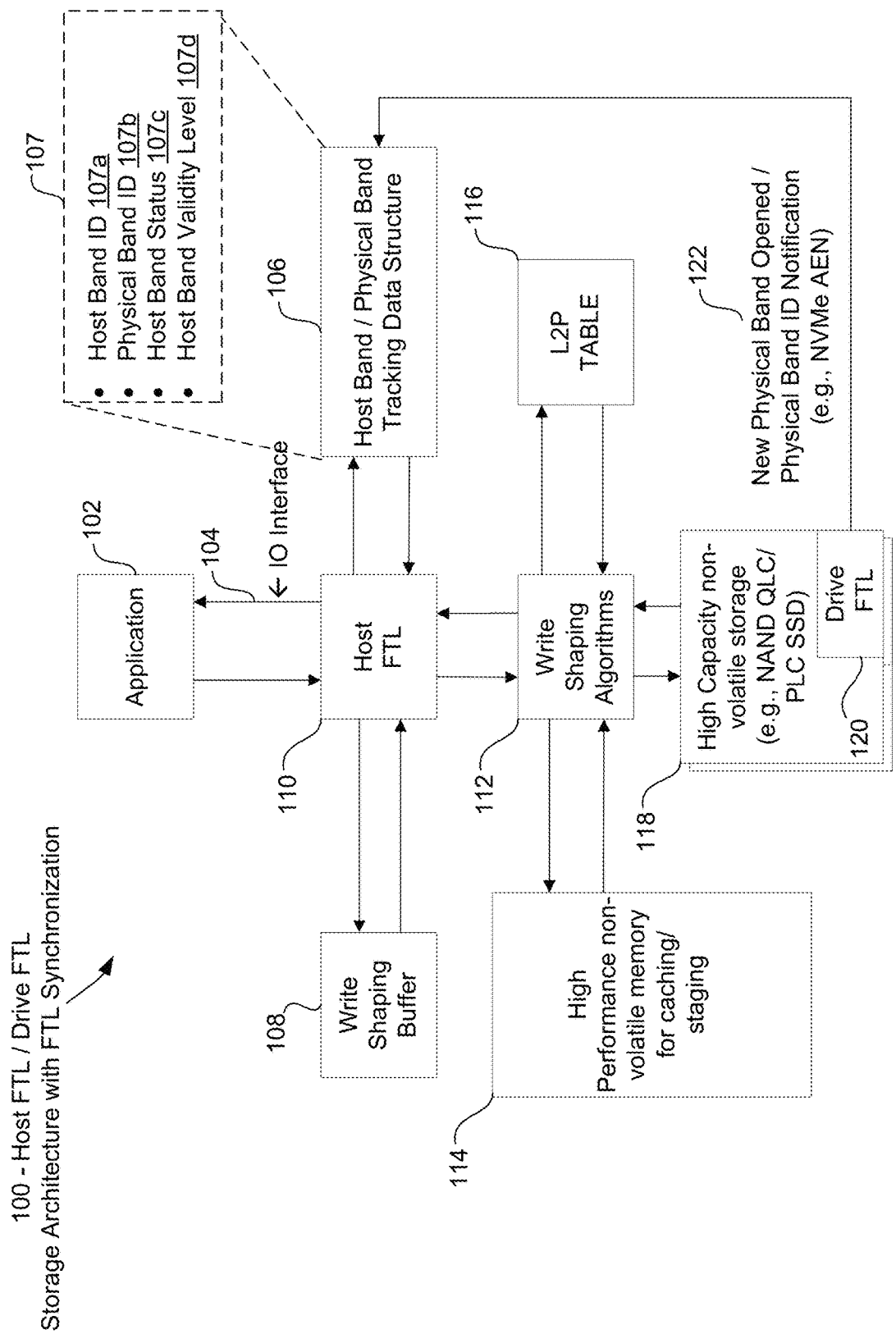
FIG. 1 illustrates a block diagram of an example storage architecture in which an embodiment of FTL synchronization can be implemented.

FIG. 1 illustrates a block diagram of an example storage architecture 100 in which an embodiment of FTL synchronization can be implemented. One or more applications 102 issue requests to create, write, modify and read data maintained in a storage system combining a high performance non-volatile memory (NVM) device 114 for caching and staging data, and one or more high capacity non-volatile memory (NVM) storage devices 118, such as a NAND QLC (Quad Level Cell)/PLC (Penta Level Cell) SSD for storing data, hereafter referred to as an NVM storage drive 118. The storage architecture 100 allows a host FTL 110 to receive user writes over an IO interface 104 and to access a write shaping buffer 108 and write shaping algorithms 112 to shape the user writes into shaped writes. The shaped writes are staged on the high performance NVM device 114 for writing back to the high capacity NVM storage drive 118. The shaped writes are typically large, sequential, indirection-unit (IU) aligned writes designed to reduce write amplification at the drive FTL 120.

Despite the use of write shaping to reduce write amplification at the drive FTL 120, the storage architecture 100 can actually cause an even greater write amplification problem by stacking the host FTL 110 on top of the drive FTL 120. The reason is because the overall write amplification of the storage architecture 100 is multiplicative and not additive. For example, if the host FTL 110 write amplification factor (Host WAF) is 2 and drive FTL 120 write amplification factor (Drive WAF) is 3, then the overall system write amplification factor (System WAF) becomes 2×3=6.

Figure 2:
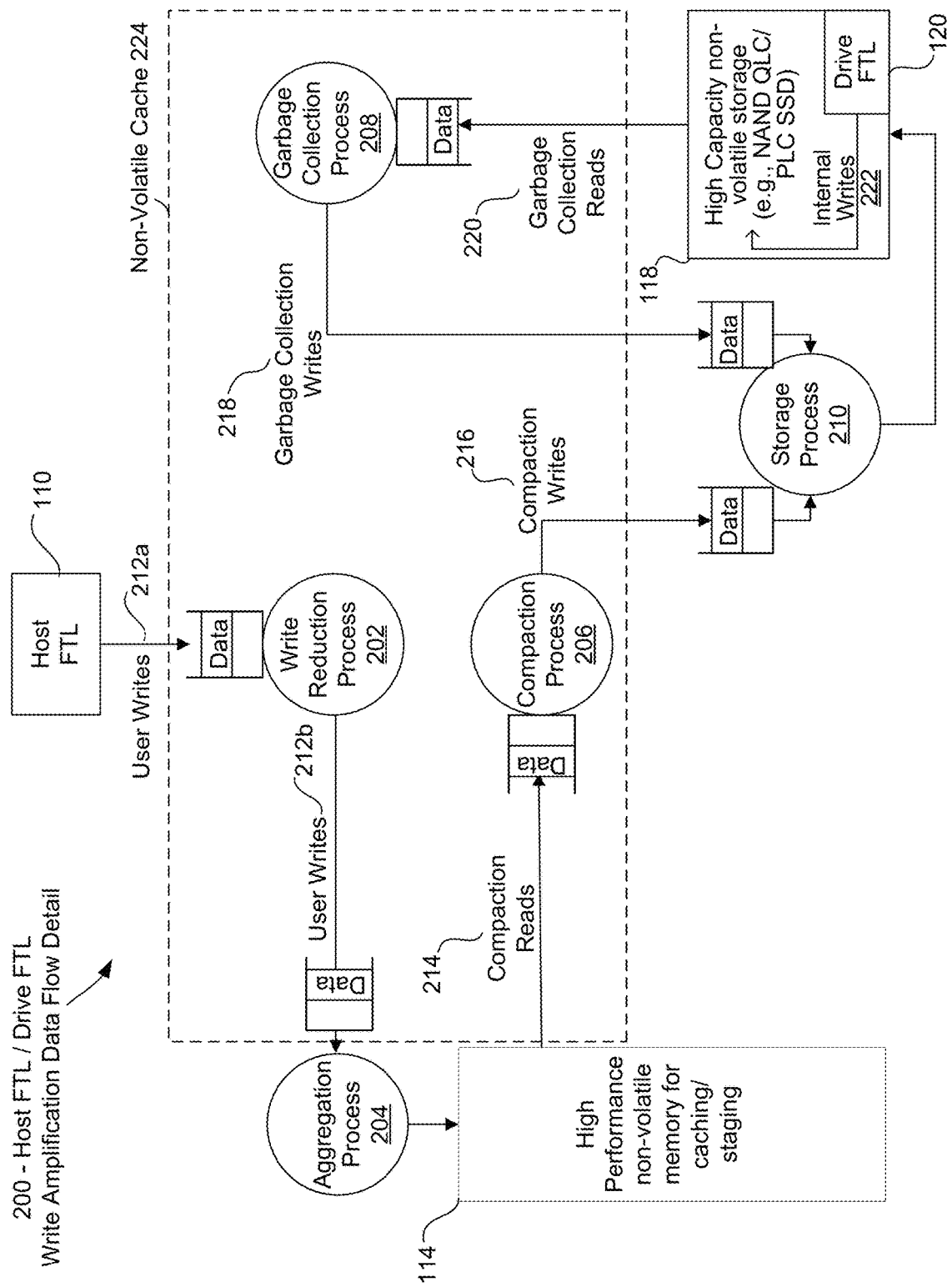
FIG. 2 illustrates a block diagram of an example of write amplification data flow without the benefit of FTL synchronization.

To examine the cause of this paradoxical increase in write amplification, FIG. 2 illustrates the write amplification data flow in detail 200. As shown, user writes 212a/212b are staged in a high performance NVM device 114. In non-volatile cache 224, write reduction process 202 and aggregation process 204 attempt to reduce writes to the high capacity NVM storage drive 118. For example, the aggregation process 204 can combine small user writes 212a/212b into large writes staged in the high performance NVM device 114. A compaction process 206 issues compaction reads 214 to the high performance NVM device 114 and replaces invalid data (i.e., data marked as no longer valid) with valid data. The compaction process 206 further issues compaction writes 216 to a storage process 210 to store the compacted data to the high capacity NVM storage drive 118. The host FTL 110 rewrites some of the data from the high capacity NVM storage drive 118 during the garbage collection process 208 using garbage collection reads 220 and garbage collection writes 218. In addition, high capacity NVM storage drive 118 needs to eventually perform its own garbage collection process to make free space resulting in the drive FTL 120 issuing its own internal writes 222. The overall write amplification factor (System WAF) from all of these writes can be computed using the following equation:

(System$WAF$=Host$WAF$*(1−$WRF$)*(Drive$WAF$))

where System WAF represents the overall write amplification factor of storage architecture 100, WRF represents the write reduction factor, Host WAF represents the write amplification attributable to the host FTL and Drive WAF represents the write amplification attributable to the drive FTL. The Host WAF can be computed using the following equation:

$$\text{Host } WAF = \frac{\text{Compaction Writes} + \text{Garbage Collection Writes}}{\text{Compaction Writes}}$$

The Drive WAF can be computed using the following equation:

$$\text{Drive } WAF = 1 + \frac{\text{Drive Internal Writes}}{\text{User Writes} * (1 - WRF) * \text{Host } WAF}$$

Lastly, the WRF can be computed using the following equation:

$$WRF = \frac{\text{User Writes} - \text{Compaction Writes}}{\text{User Writes}}$$

Embodiments of FTL synchronization operate to minimize the overall System WAF by synchronizing the operation of the host FTL 110 with the drive FTL 120 through host band to physical band mapping, host band validity level tracking and host FTL 110 defragmentation operations performed on the high capacity NVM storage drive 118, such as the garbage collection operations based on the tracked host band validity levels.

In one embodiment, FTL synchronization operates to maintain the Drive WAF at or near unity, thereby eliminating or at least reducing the multiplicative effect on the overall System WAF. Thus, the above equation for System WAF (System$WAF$=Host$WAF$*(1−$WRF$)*(Drive$WAF$))

can be rewritten as:

(System$WAF$=Host$WAF$*(1−$WRF$)*(1))

which simplifies to:

(System$WAF$=Host$WAF$*(1−$WRF$))

As a result, using embodiments of FTL synchronization as described herein, the overall System WAF is primarily driven by the Host WAF. For this reason, embodiments of FTL synchronization can eliminate, or at least reduce, the drive FTL over-provisioning to minimum acceptable levels in addition to reducing the Drive WAF.

Figure 3A:
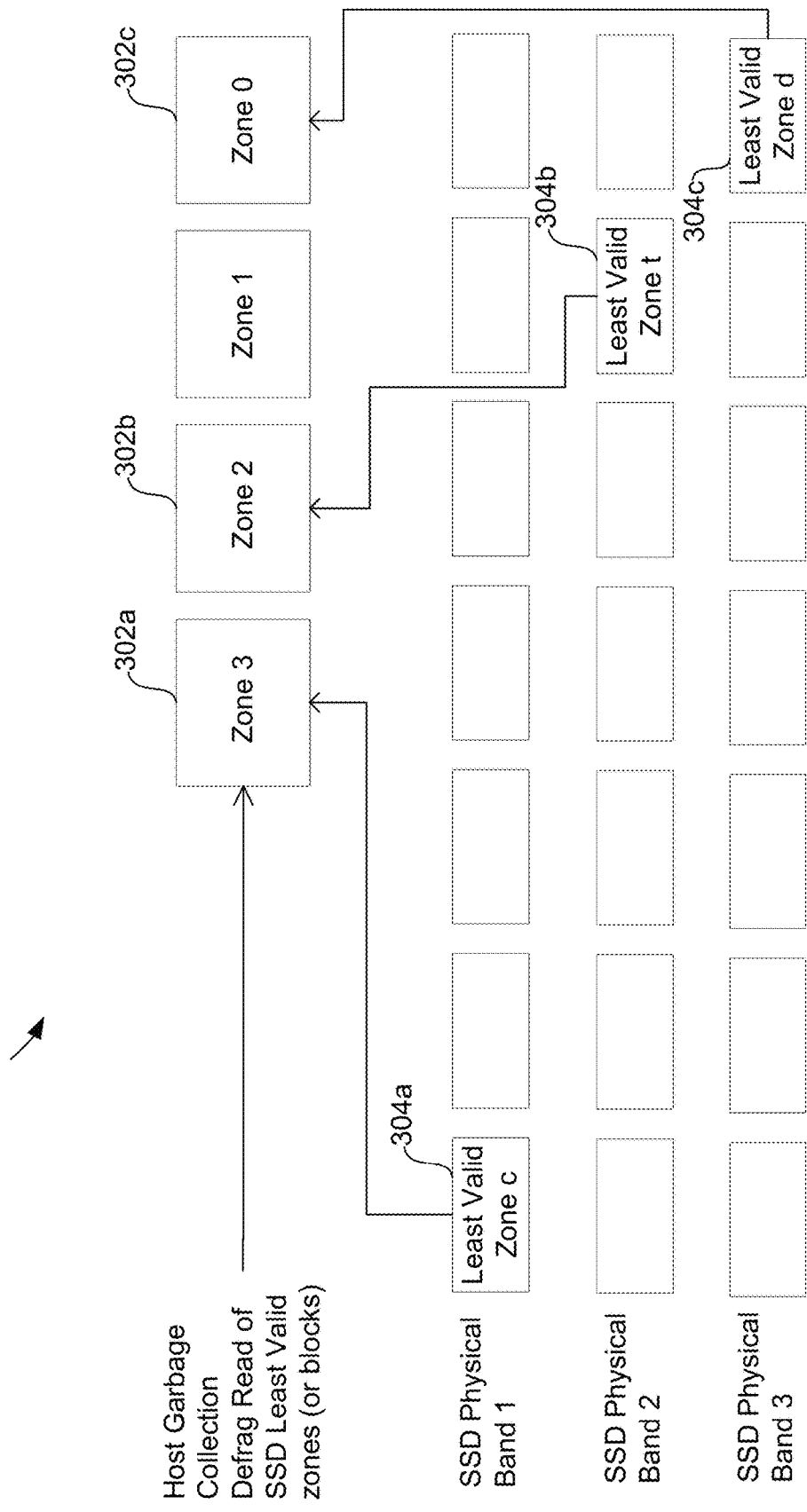
FIG. 3A illustrates a block diagram of an example of the consequences of garbage collection performed without the benefit of FTL synchronization.
Figure 3B:
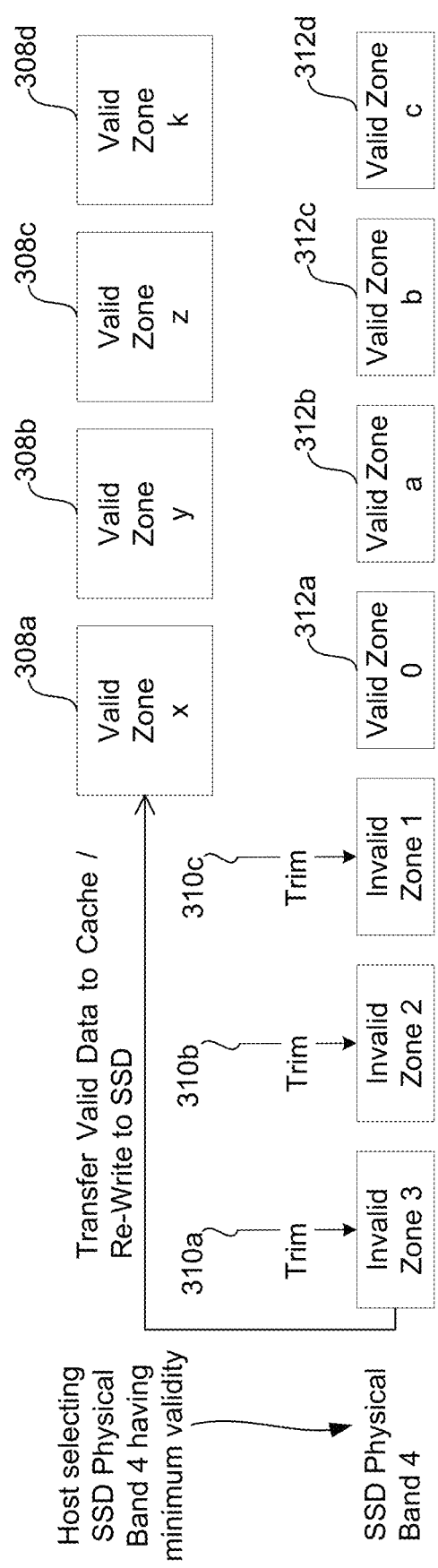
FIG. 3B illustrates a block diagram of an example of a write amplification that occurs without the benefit of FTL synchronization.

FIGS. 3A and 3B illustrate block diagrams of examples of the consequences of not keeping the Drive WAF in check using FTL synchronization. In FIG. 3A, example 300, when host FTL 110 invokes garbage collection, it can try to find host bands (such as blocks or zones of data) which have the least valid data (minimal validity level) based on how the corresponding data is marked (valid or no longer valid) in a logical-to-physical address table (L2P) 116 maintained at the host FTL 110 SW stack level. However, the physical locations of the data in the high capacity NVM storage drive 118 might not be aligned to the media physical address granularity. For this reason, the host FTL 110 SW stack defragmentation operations may minimize the garbage collection for the host FTL 110 while unintentionally increasing the garbage collection for high capacity NVM storage drive 118.

This unintended consequence is illustrated by example 300, in which optimum invalidated host bands, such as zones 302a, 302b and 302c as determined by the host FTL 110 map to separate physical bands of the high capacity NVM storage drive 118. An optimum invalidated host band contains data at a minimum validity level and is thus considered an optimal host band for garbage collection. Invalidated zone 302a is on Physical Band 1 at location 304a, invalidated zone 302b is on Physical Band 2 at location 304b and invalidated zone 302c is on Physical Band 3 at location 304c. Relocating the data that is still valid in those zones can increase the drive FTL 120 write amplification inside the high capacity NVM storage drive 118 in which the separate physical bands reside.

Furthermore, in FIG. 3B, example 306, when the host FTL 110 tries to optimize write amplification at the drive FTL 120 level directly by selecting a physical band on the high capacity NVM storage drive 118 with a minimum validity level for garbage collection, some of the data in the physical band can map to host bands (e.g., host-managed zones) that have high validity levels. As shown, the Physical Band 4 Invalid Zone 3 310a, Invalid Zone 2 310b and Invalid Zone 1 310c, as well as remaining Valid Zone 0 312a, Valid Zone a 312b, Valid Zone b 312c, and Valid Zone c 312d contain valid data, all of which the host FTL 110 must transfer to the host-managed cache in Valid Zone x 308*a*, Valid Zone y 308*b*, Valid Zone z 308*c*, and Valid zone k 308*d*. Eventually, the host FTL 110 must re-write the transferred valid data back to the high capacity NVM storage drive 118, thereby increasing the host FTL 110 write amplification.

To address the foregoing challenges without the unintended consequences of increasing write amplification rather than decreasing it, embodiments of FTL synchronization can be implemented in the storage architecture 100 illustrated in FIG. 1 to provide physical band observability at the host FTL 110 SW stack level for physical bands residing on the high capacity NVM storage drives 118. Physical band observability allows the host FTL 110 to perform FTL operations that align with the physical bands. In addition, the host FTL 110 can optimize defragmentation operations by making any trim or unmap decisions at the host FTL 110 SW stack level using a single decision process instead of the current decoupled decision processes that occur across the host FTL 110 and the drive FTL 120.

Among other advantages, embodiments of FTL synchronization can eliminate or at least reduce drive FTL 120 write amplification because the host FTL 110 is able to invalidate an entire physical band inside the drive. This allows the elimination or reduction of over-provisioning inside the high capacity NVM storage drive 118 and a Drive WAF of 1, or at unity. Unlike other attempts to solve the problem of system write amplification, such as the NVMe Zoned Namespaces (ZNS) protocol in the NVMe 2.0 specification, embodiments of FTL synchronization can be implemented for all SSDs without having to adopt a different protocol.

Depending on workload and requirements, the host FTL SW stack can tune its own over-provisioning and, with FTL synchronization, can reduce the host FTL SW stack over-provisioning to a minimum acceptable level. Importantly, since the host FTL 110 has the physical band observability of the drive FTL 120 internal physical band invalidation, the host FTL 110 can adapt the processes to reduce write amplification and over-provisioning accordingly. Lastly, as host bands and physical bands are aligned, the host FTL SW stack can optimize its block size or chunk size as a function of physical band capacity, thereby allowing FTL synchronization to be appropriately scaled to various capacities of a high capacity NVM storage drive 118.

Turning back to FIG. 1, in one embodiment, the host FTL 110 maintains a host band/physical band tracking data structure 106 that maps a host band identification (host band ID) 107*a* representing a host band in which the host FTL 110 manages data with a physical band identification (physical band ID) 107*b* representing a physical band on the one or more high capacity NVM storage drives 118 where data is stored. The host FTL 110 is capable of receiving a notification 122 from the one or more high capacity NVM storage drives 118 when a new physical band is opened. The notification 122 provides the host FTL 110 with the ability to map the host band IDs 107*a* of the host bands in which data is managed to the physical band IDs 107*b* of the physical bands where data is stored. In one embodiment, the notification 122 is transmitted as an Asynchronous Event Notification (AEN) in accordance with a communication protocol such as the Non-Volatile Memory Express (NVMe) Specification, revision 1.2, also published in November 2014 ("NVMe specification").

In one embodiment, the host band/physical band tracking data structure 106 further includes a host band status 107*c* to indicate whether a host band is available to accommodate more data. Similar to status information for physical bands, the host band status 107*c* indicates whether a newly opened host band contains no data (status=free), contains some data but available to accommodate more data (status=open), or is full and not available to accommodate more data (status=closed). The threshold for determining a host band status 107*c* can be a threshold amount of host-managed space available to contain data, where the threshold can vary depending on the implementation.

In one embodiment, the host band/physical band tracking data structure 106 further includes a host band validity level 107*d*. As noted earlier, in NVM Flash devices, such as NVM storage device 118, data is typically marked as valid or no longer valid by logical block address (LBA) as maintained in the L2P table 116. A host band validity level 107*d* is typically expressed as a percentage of data managed in the host band that is still valid. The validity level typically decreases over time as more of the data is marked as no longer valid due to being erased or deleted from the physical band where it was stored, or otherwise marked as no longer valid.

Figure 4:
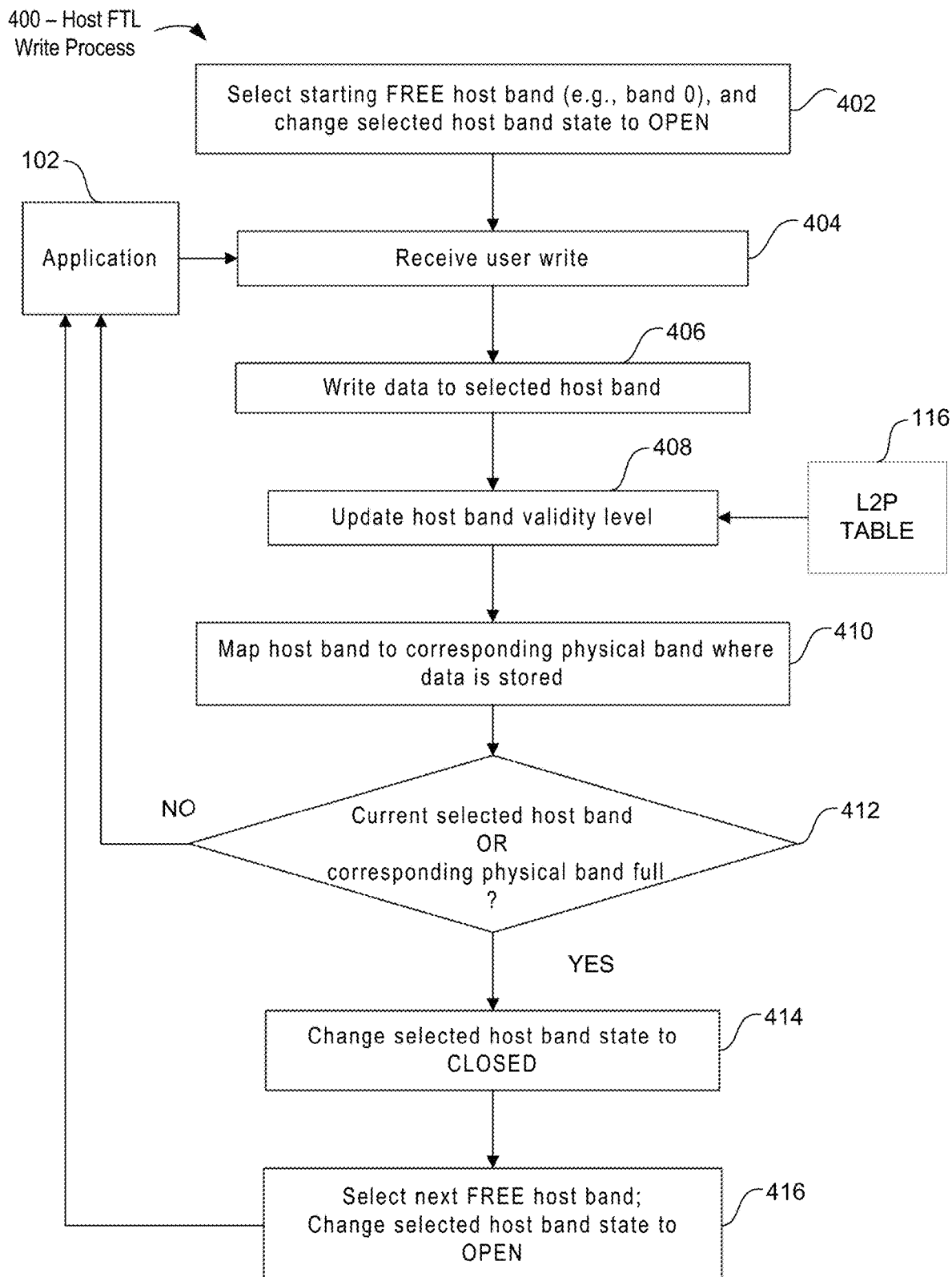
FIGS. 4-5 illustrate flow diagrams of example host FTL processes in accordance with embodiments FTL synchronization.
Figure 5:
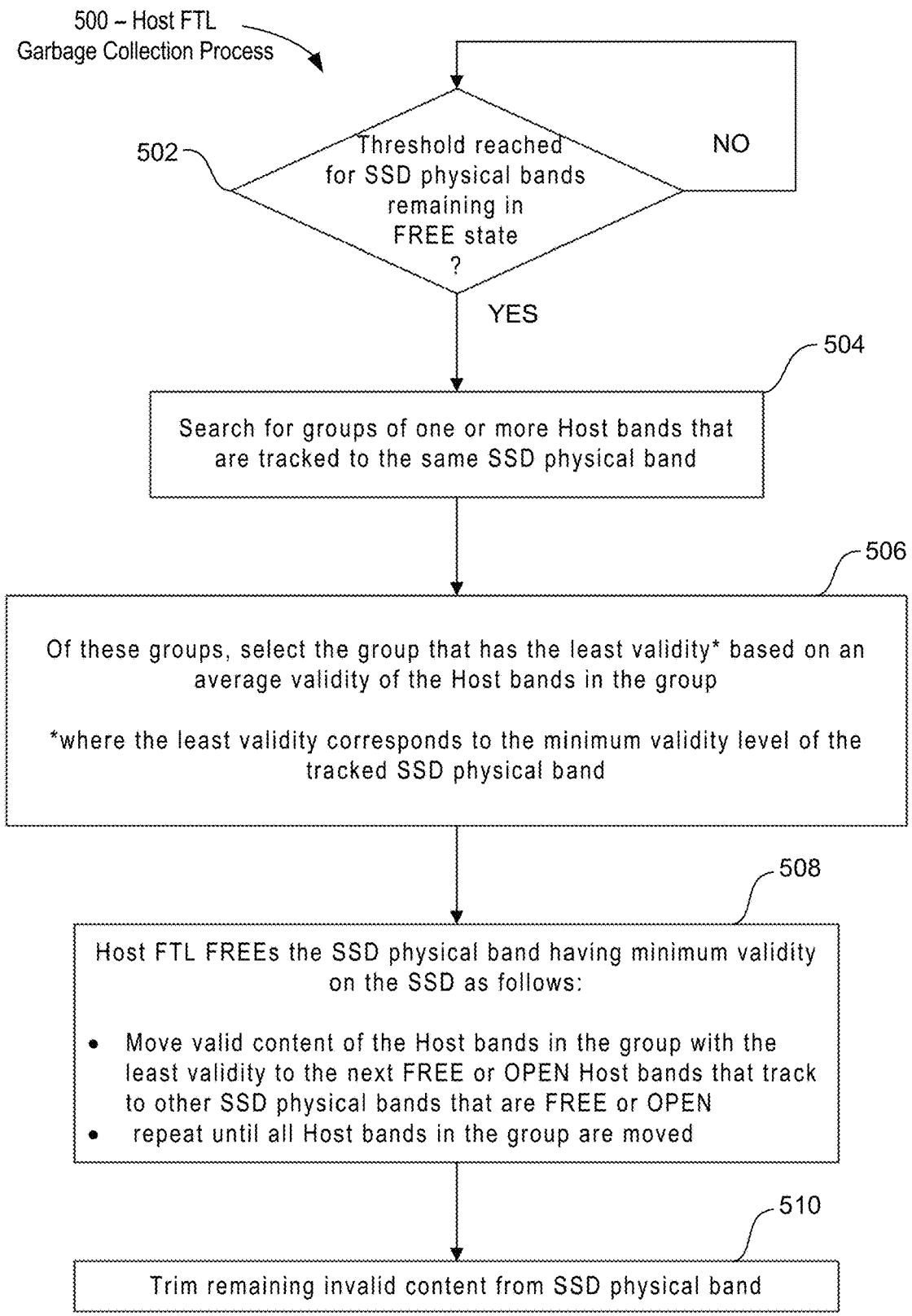

FIGS. 4-5 illustrate flow diagrams of example host FTL write process 400 and an example host FTL garbage collection process 500 that can be used to implement an embodiment of FTL synchronization as illustrated in FIG. 1. FIGS. 4-5 as illustrated herein provide examples of sequences of various process actions. The process diagrams can indicate processes, operations or actions to be executed by a software or firmware routine, as well as physical operations or actions. In one embodiment, a process diagram can illustrate the state of a finite state machine (FSM), which can be implemented in hardware and/or software. Although shown in a particular sequence or order, unless otherwise specified, the order of the processes, operations or actions can be modified. Thus, the illustrated embodiments should be understood as an example, and the processes, operations or actions can be performed in a different order or in parallel. Additionally, one or more processes, operations or actions can be omitted in various embodiments; thus, not all processes, operations or actions are required in every embodiment. Other sequences or orders of processes, operations or actions are possible.

In FIG. 4, the write process 400 begins at 402 in which a host FTL 110 selects a starting host band having a host band status of FREE indicating that the host band is empty, and changes the host band state to OPEN to reflect that the host band is available for managing data. At 404, a host FTL 110 receives a user write from application 102. At 406 the host FTL 110 writes the data to the selected host band. At 408, the FTL 110 updates the host band validity level based on whether the data is marked as valid or no longer valid in the L2P table 116. At 410, the host FTL 110 maps the selected host band to the corresponding physical band where the data is stored.

In one embodiment, at decision block 412, the host FTL 110 determines whether the current selected host band is FULL, or if the corresponding physical band is FULL. If NO (neither is FULL), then processing continues to receive the next user write at 404. If YES (either one or both are FULL), then at 414 the host FTL 110 changes the current selected host band state to CLOSED, and at 416, concludes the process 400 by selecting the next FREE host band and changing the selected host band state to OPEN in preparation for receiving and processing the next user write at 404.

In FIG. 5, the garbage collection process begins at decision block 502 in which the host FTL 110 determines whether a threshold has been reached for the number of physical bands remaining in the FREE state. If NO, the host FTL 110 continues to monitor the number of physical bands remaining in the FREE state. But if YES, then the host FTL garbage collection process 500 continues at 504 to search for groups of one or more host bands that have been mapped to the same physical band where their data is stored. At 506 the process 500 continues in which the host FTL 110 selects from among the searched groups, the group that has the least validity based on an average validity level of the host bands in the group. The average validity level of the selected group can be used to determine that the corresponding physical band where the group's data is stored is a physical band with a minimum validity level, and thus a candidate for garbage collection.

In one embodiment, at 508, the host FTL 110 frees the physical band with the minimum validity by invalidating the entire physical band. The host FTL 110 moves the data that is still valid in the group's host bands to the next FREE or OPEN host bands that map to other physical bands that are also FREE or OPEN, such as the write process 400 in FIG. 4. The moves of valid data in the group's host bands is repeated until all valid data is moved. At 510, the process 500 concludes with the host FTL 110 issuing trim commands to trim the remaining invalid content from the entire physical band, leaving it in a FREE state.

FIGS. 6A-6G illustrate flow diagrams of example host FTL write flow processes in accordance with embodiments FTL synchronization. In FIGS. 6A-6G, a sequence of snapshots of an example write flow 600 for a host FTL 110 managing a high capacity storage drive 118 is shown. By way of example only, the high capacity storage drive 118 is a QLC 16 Terabyte drive with QLC physical band size of ~72GigaBytes (GB) each, and the host FTL 110 host band size is 1 GB. By way of example only, the host FTL 110 has a host band/physical band tracking data structure 602/106 designed in accordance with a Storage Performance Development Kit (SPDK) Flash Translation Layer Library (https://spdk.io/doc/ftl.html). As shown in the data structure 602/106, the physical band ID N starts from host band ID N*72 and ends at N*72+71. Based on this range formula, if N is 0 then the range is 0-71. If N is 1 then the range is 72 to 143, and so forth. If N is 253 then the range is 18216 to 18287. If N is 254, then the range is 18288 to 18359. And finally if N is 255 then the range is 18360 to 18431. The snapshots illustrate the host band states in the host band/physical band tracking data structure 602/106 and the physical band states 604 of the physical bands of the high capacity storage drive 118. The types of physical band states and host band states are shown in the band state key 606.

Figure 6A:
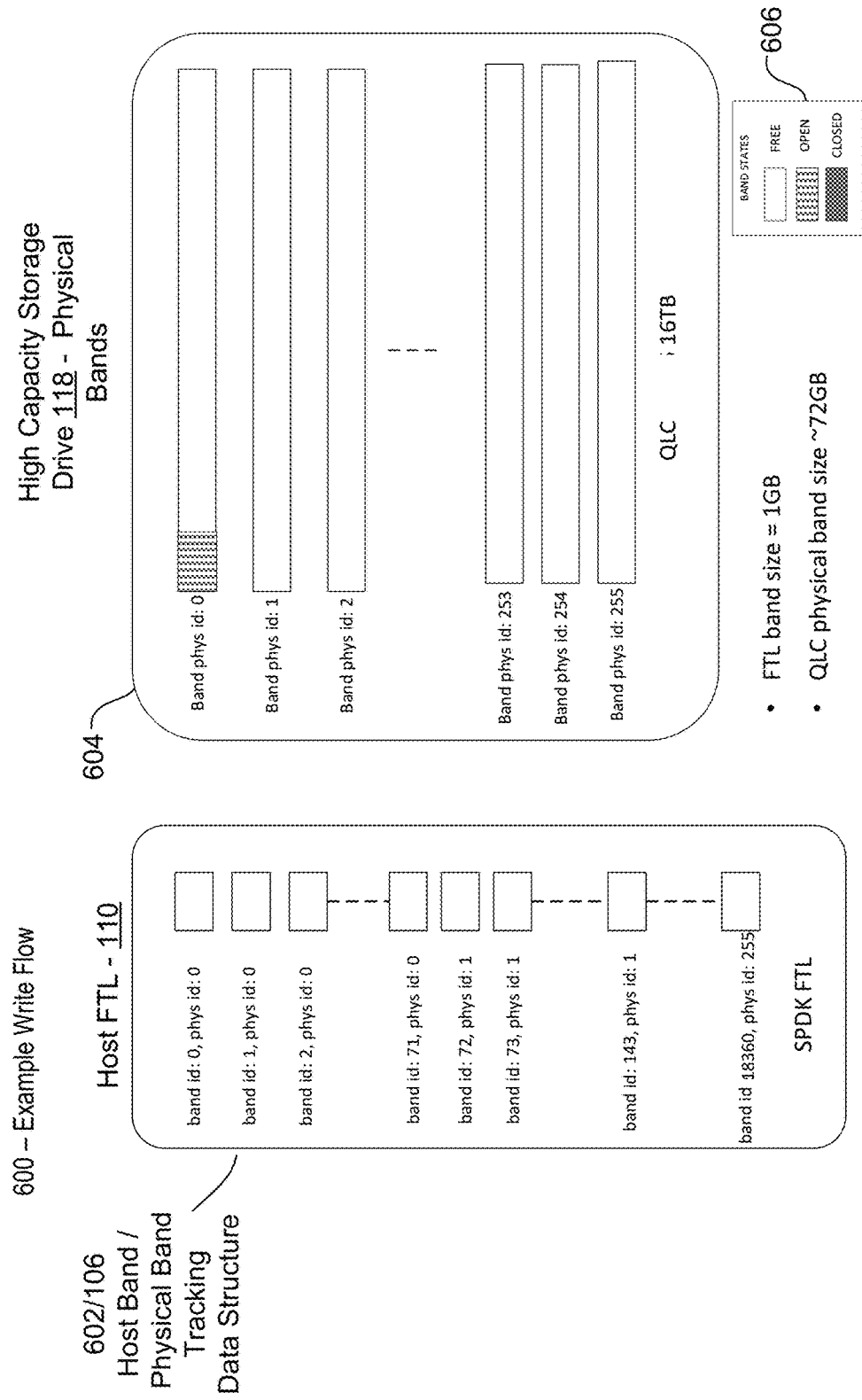
FIGS. 6A-6G illustrate flow diagrams of example host FTL write flow processes in accordance with embodiments FTL synchronization.
Figure 6B:
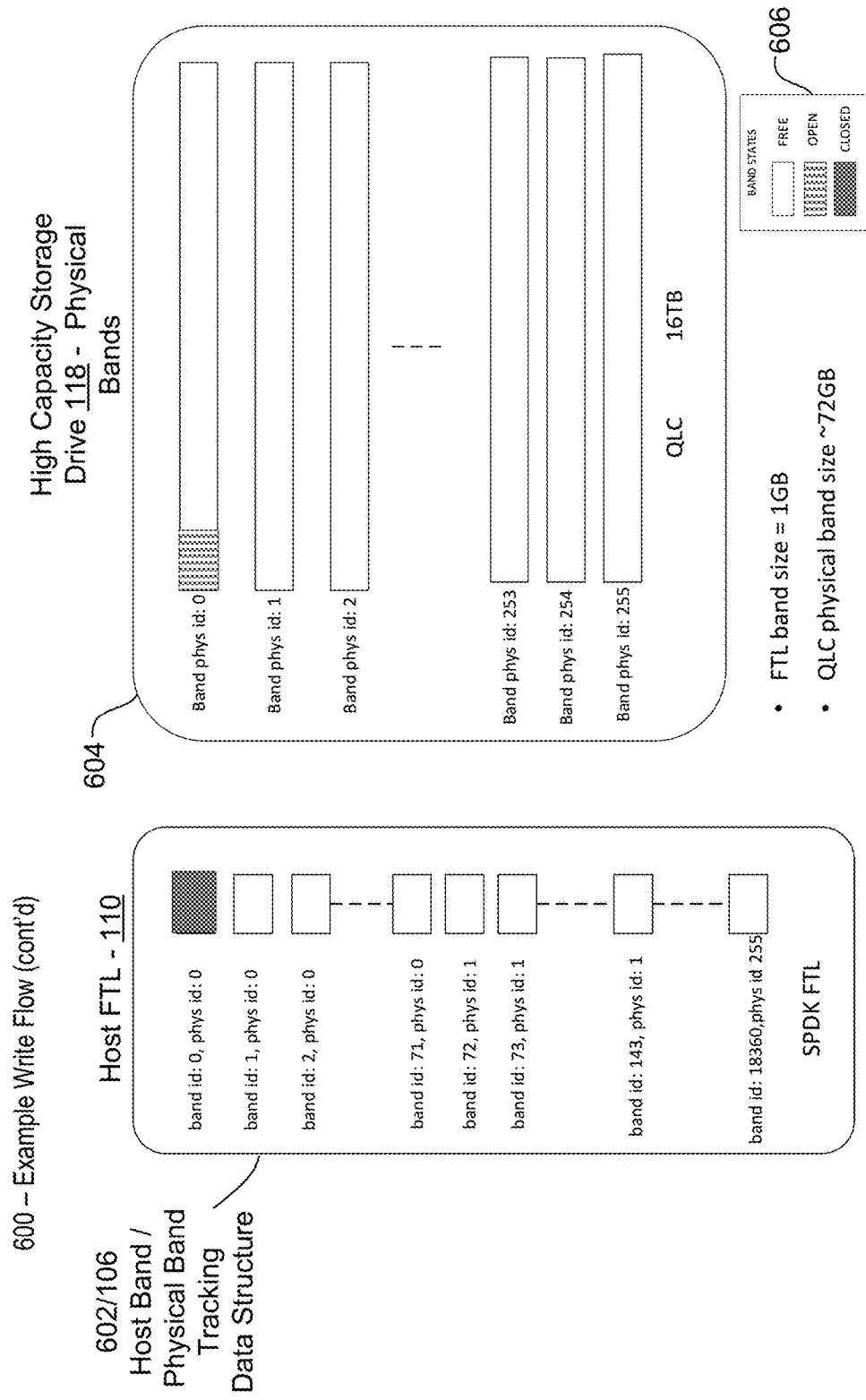
Figure 6C:
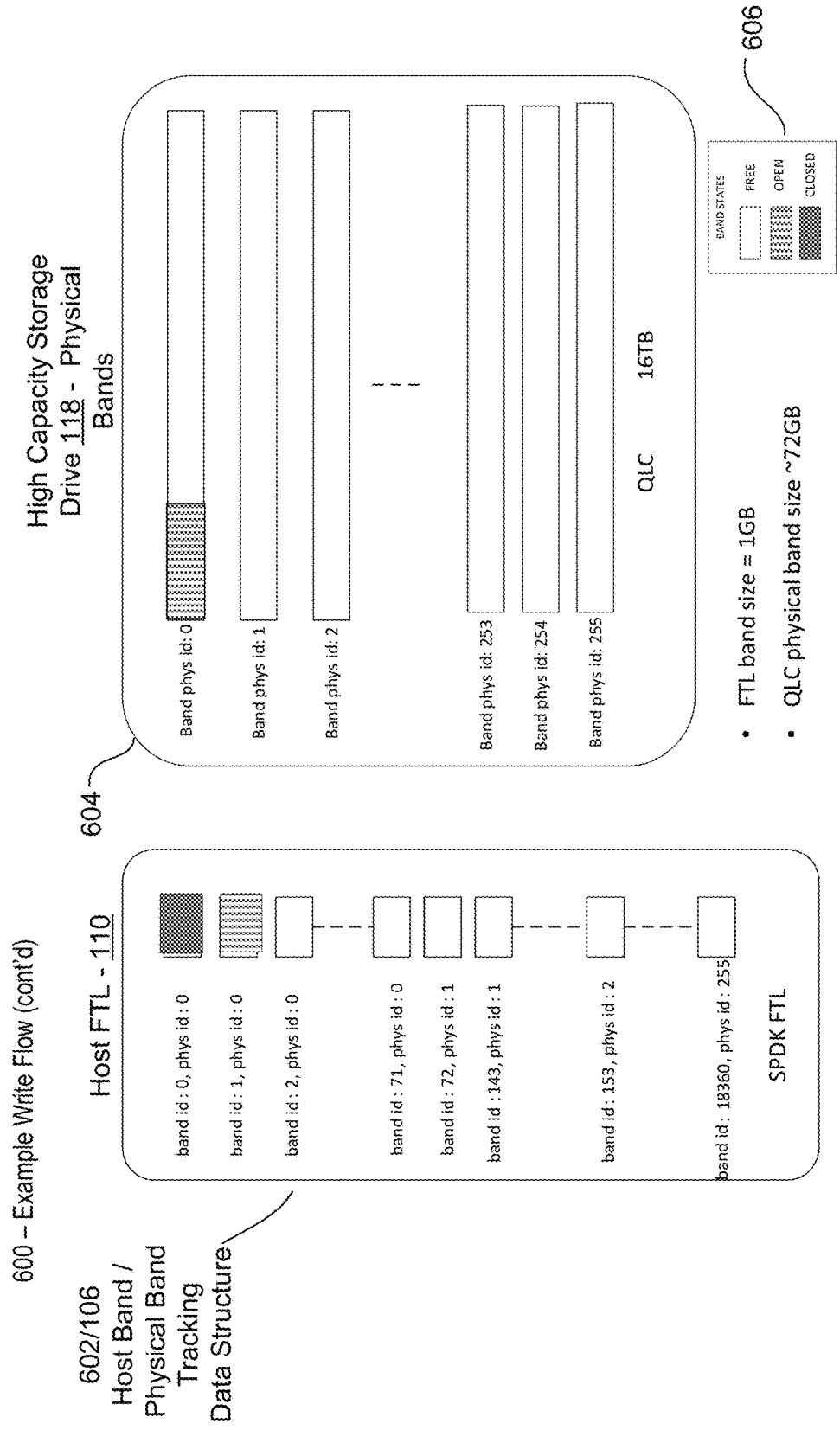
Figure 6D:
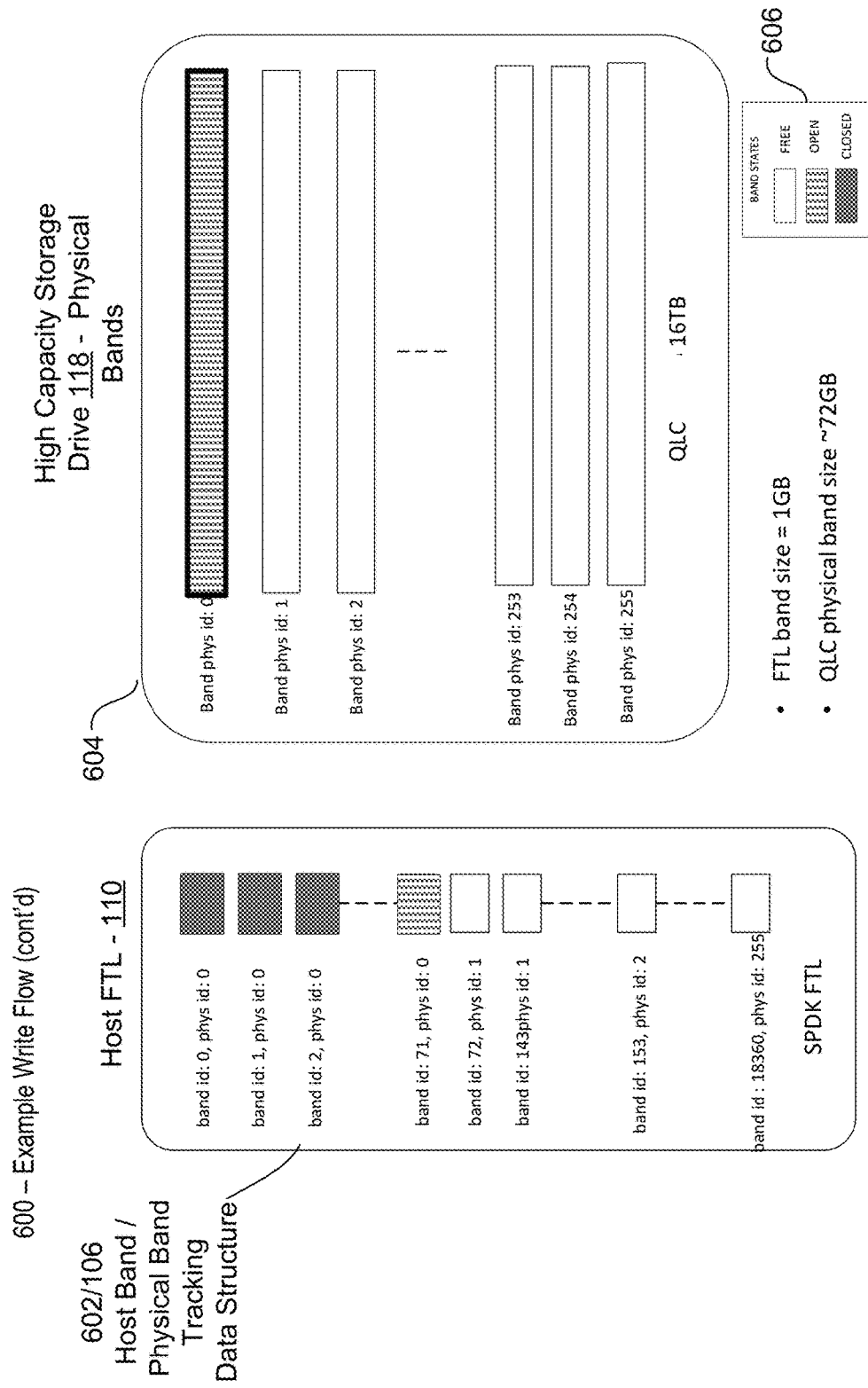
Figure 6E:
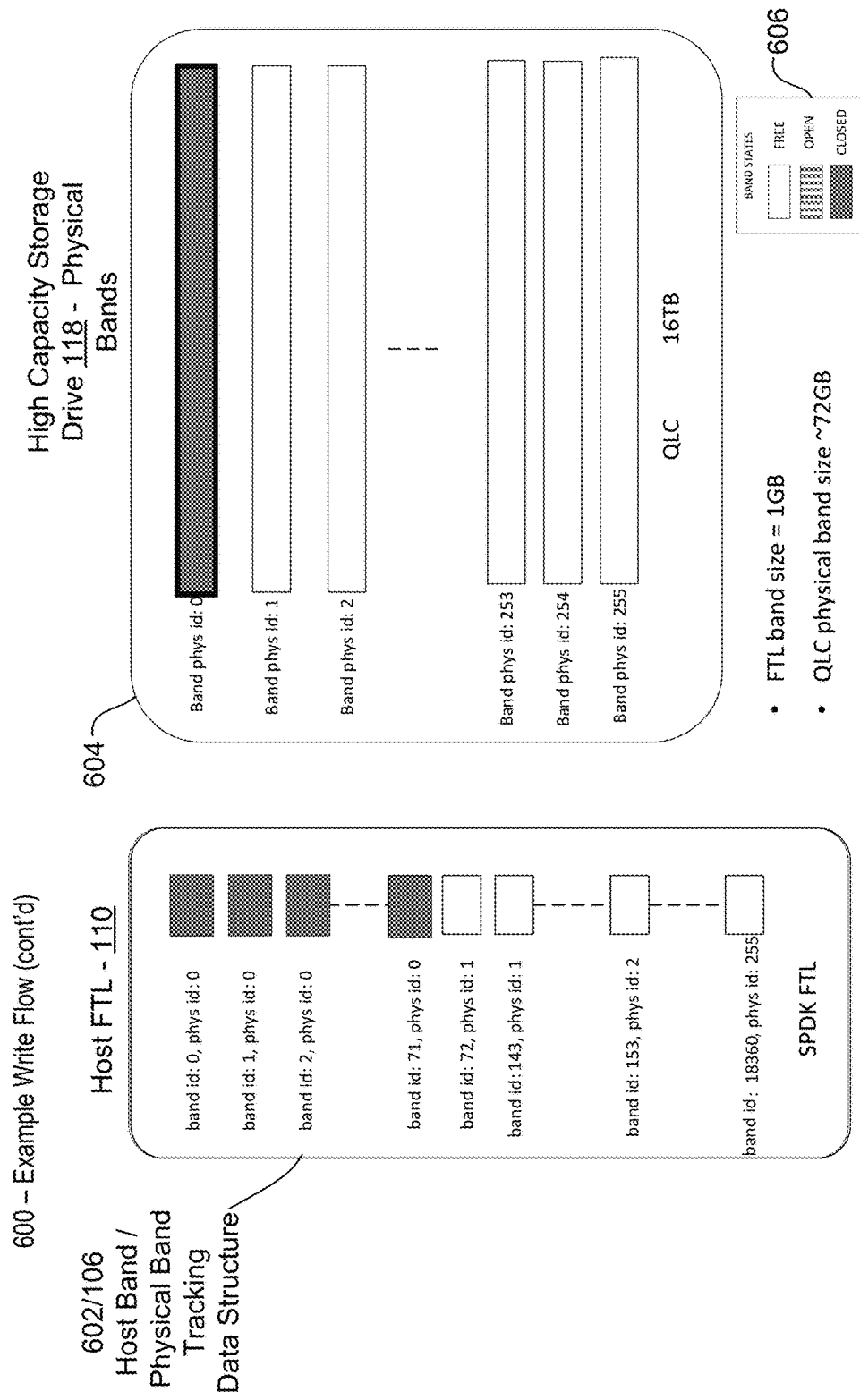
Figure 6F:
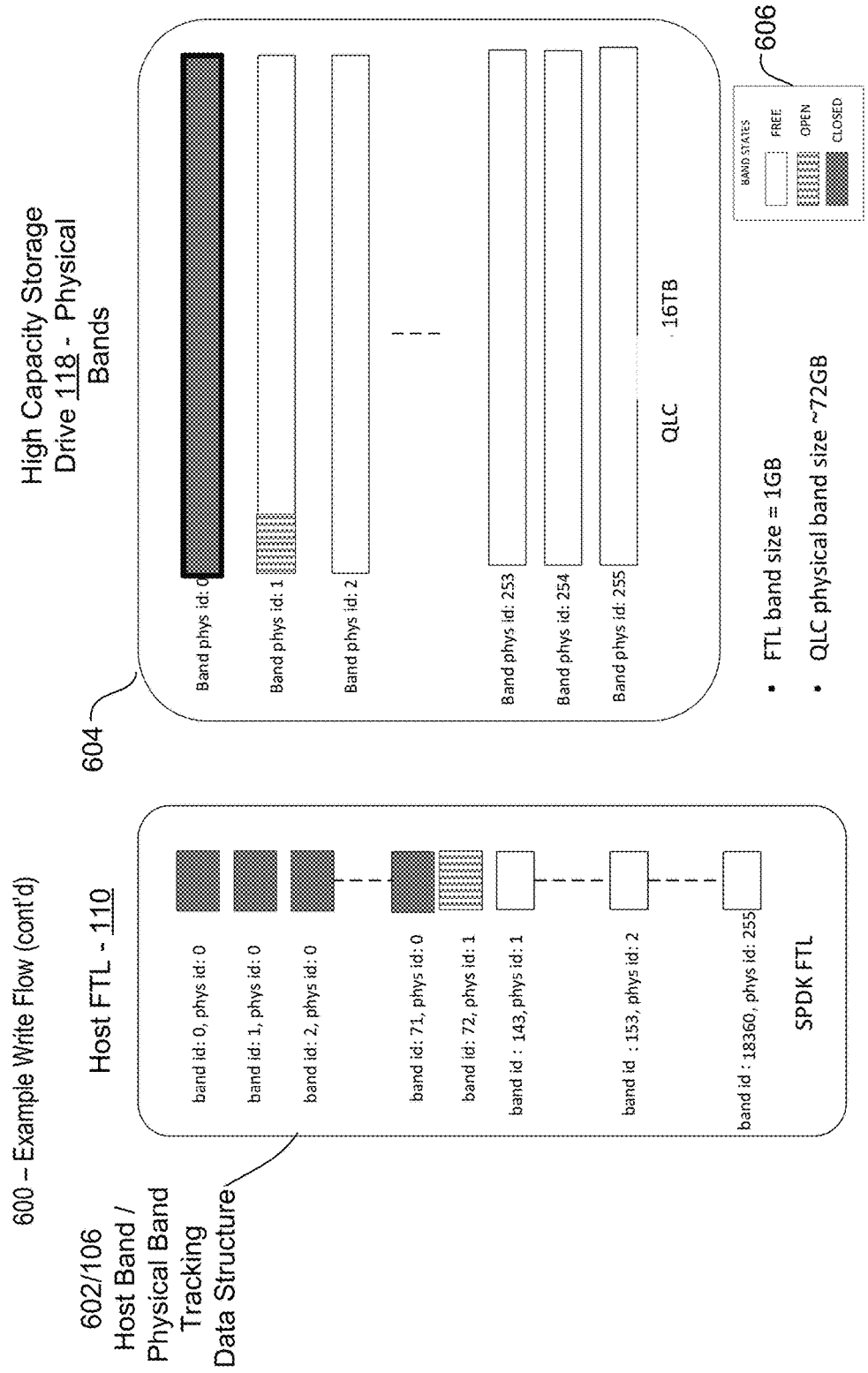
Figure 6G:
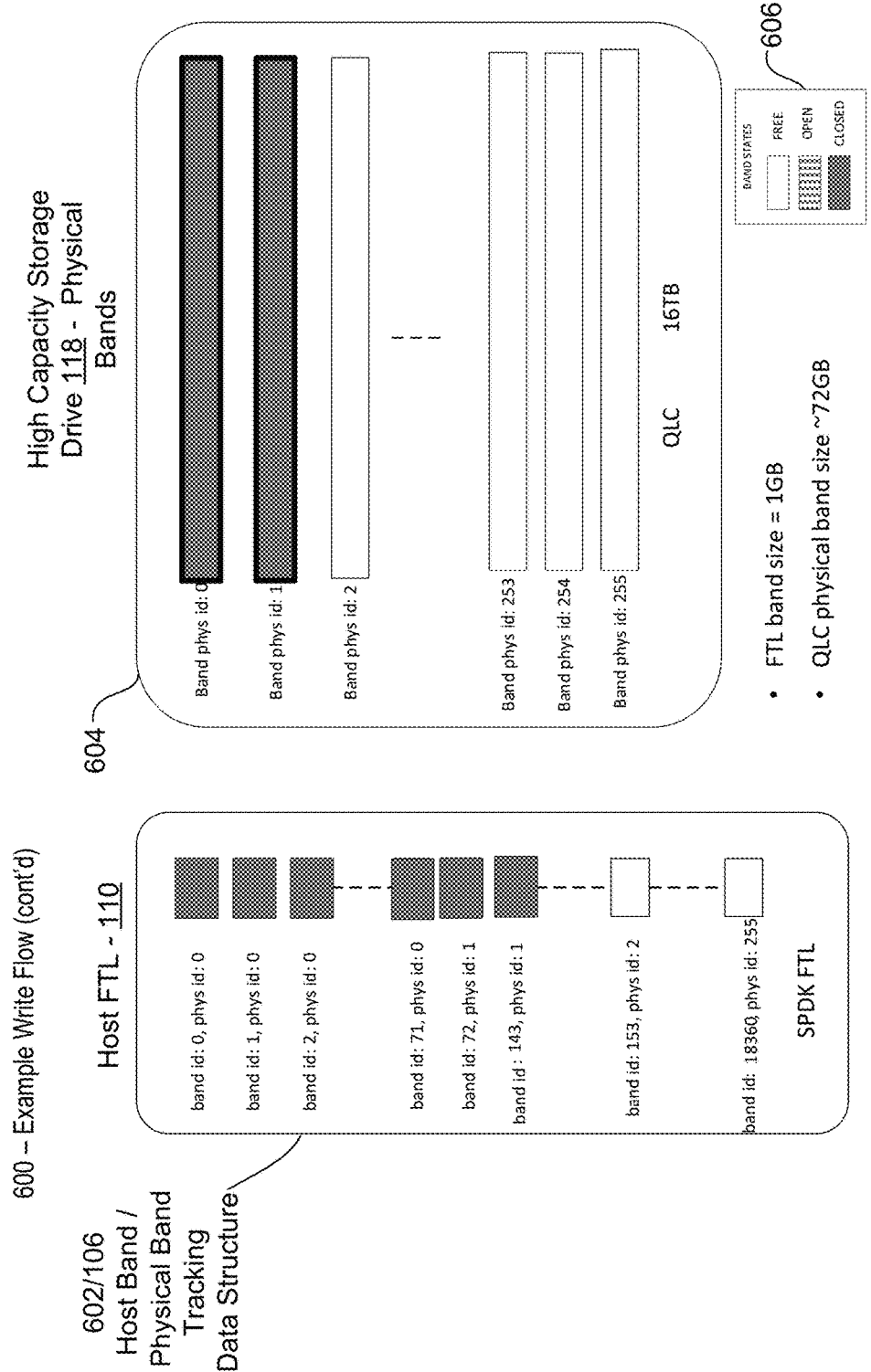

The first snapshot of the example write flow 600 in FIG. 6A shows that as the process commences, the host bands are free, and the first physical band ID 0 is open. Therefore, the FTL 110 selects host band ID 0 to write and change its state to OPEN. The second snapshot in FIG. 6B shows that the first host band ID 0 is now full and corresponds to the first physical band ID 0, which is still open. The third and fourth snapshots in FIG. 6C and FIG. 6D shows that the additional host band IDs through host band ID 71 have been filled and closed or opened, and the corresponding first physical band is still open but nearly full. As the host bands fill the host FTL changes the host band status to closed and selects the next available host band for writing. The fifth snapshot in FIG. 6E shows that the host bands IDs 0 through 71 corresponding to physical band ID 0 are now all full and therefore the host FTL 110 has updated the host band status to closed. When the physical band is full, the host FTL 110 and/or drive FTL 120 changes the physical band status to closed as well. The sixth and seventh snapshots in FIGS. 6F and 6G show that the write flow 600 continues to open and fill the next available host bands and corresponding physical bands in order since the initial status of each host band and physical band is free. Although the host FTL 110 can select the next host band, it cannot control which physical band the host band data is written to. For ease of illustration and by way of example only, the next host band IDs 72 and 143 are shown as corresponding to physical band ID 2, but the host band data could have been written to other open physical bands.

Figure 6H:
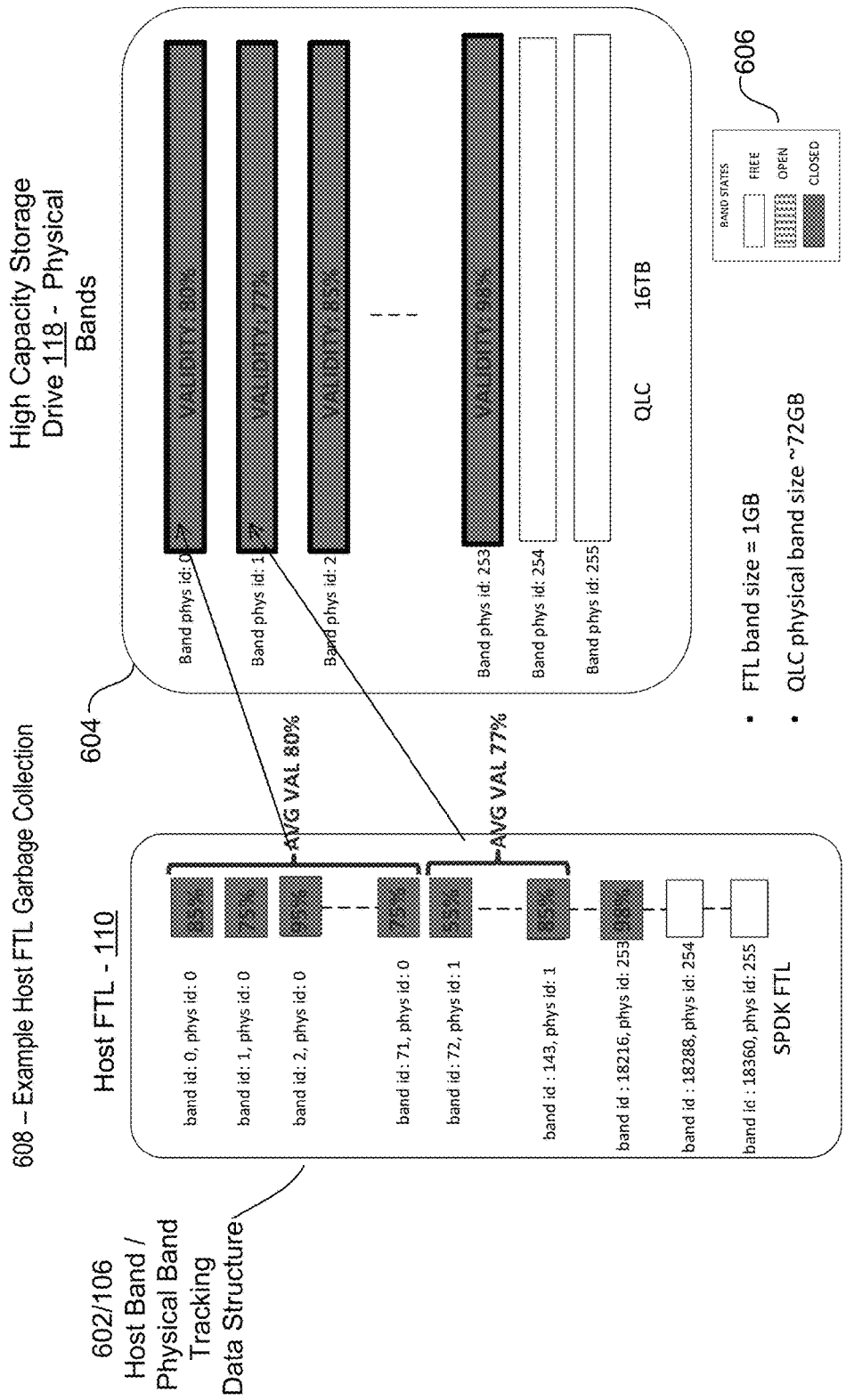
FIGS. 6H-6M illustrate flow diagrams of example host FTL garbage collection processes in accordance with embodiments FTL synchronization.

FIGS. 6H-6M illustrate flow diagrams of example host FTL garbage collection processes 608 in accordance with embodiments FTL synchronization. Continuing with the snapshots illustrated in FIGS. 6A-6G, eventually the host FTL 110 will determine that only a few host bands are available for writing data and that the threshold for initiating a garbage collection process has been met. As shown in the eighth snapshot in FIG. 6H, each host band ID has both a host status and a validity level expressed as a percentage of valid data remaining in the host bands identified by host band IDs. In one embodiment, the host FTL 110 searches for groups of host bands that are mapped to the same physical band in the host band/physical band tracking data structure 106. As shown in FIG. 6H, the group of host bands mapped to physical band ID 0 is determined to have an average validity level of 80% whereas the group corresponding to physical band ID 1 has an average validity level of 77%. Since 77% is the lower percentage value, the host FTL 110 commences moving the host bands corresponding to physical band 1 to the next available host band with a free or open status.

Figure 6I:
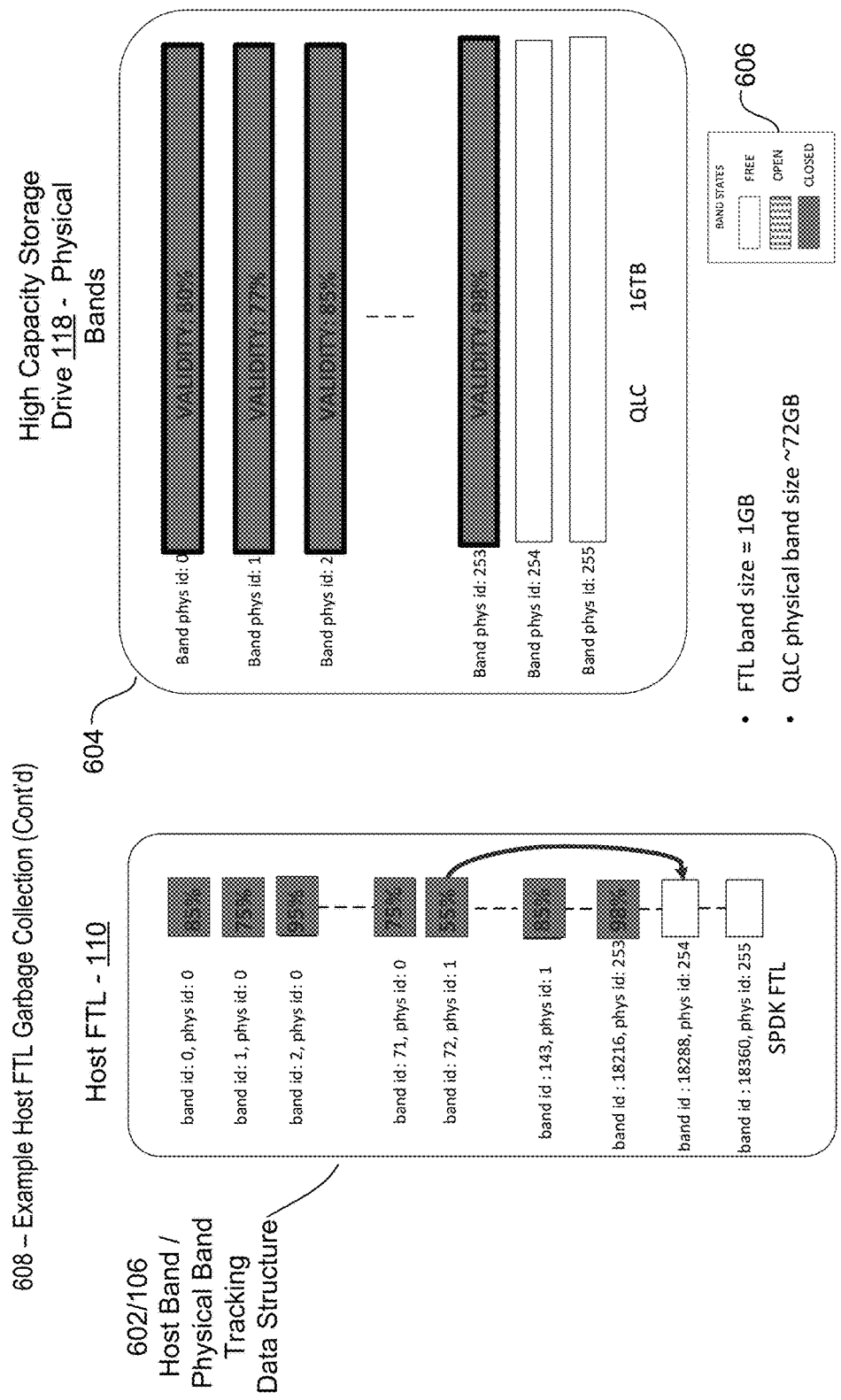
Figure 6J:
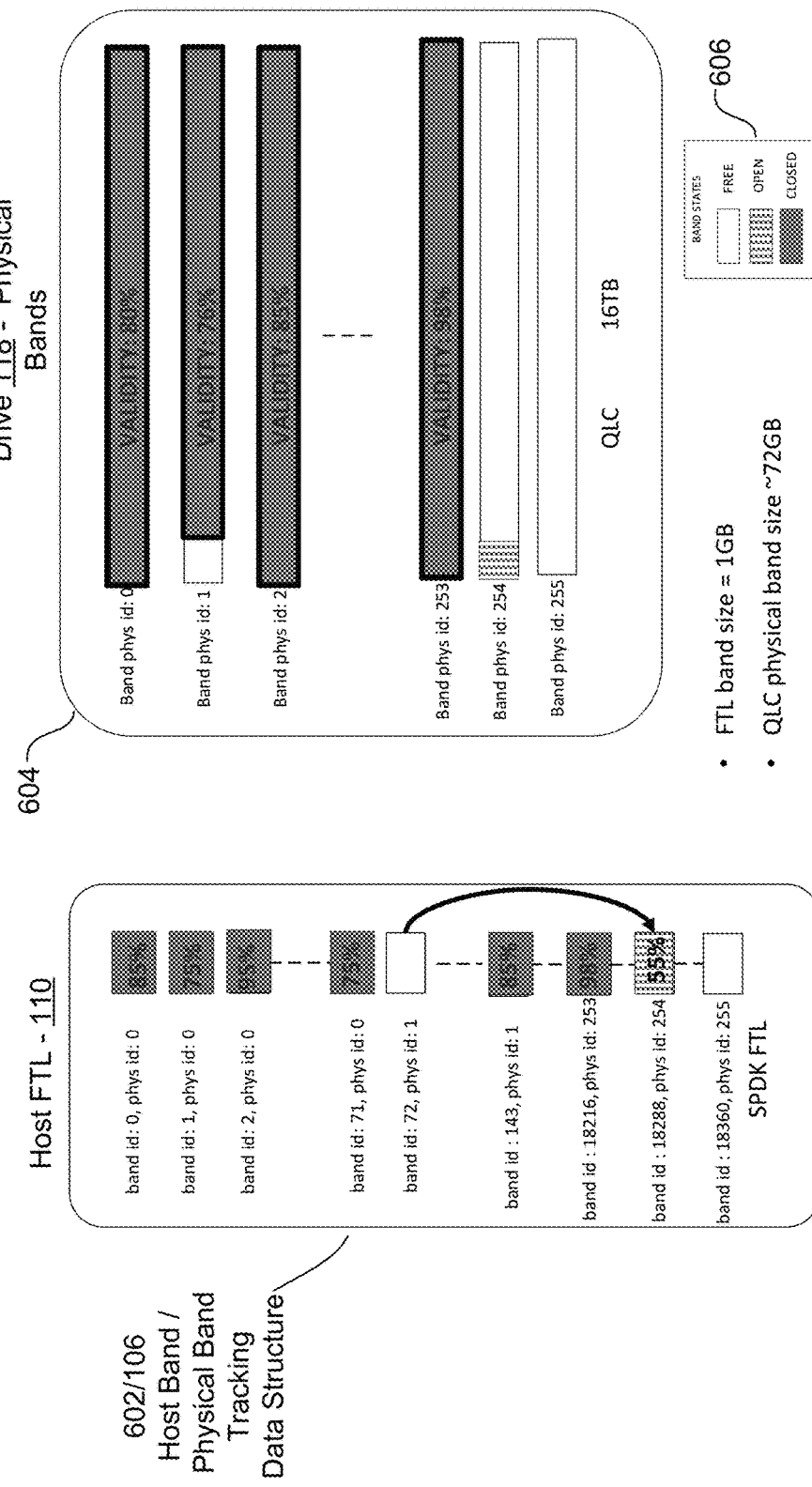
Figure 6K:
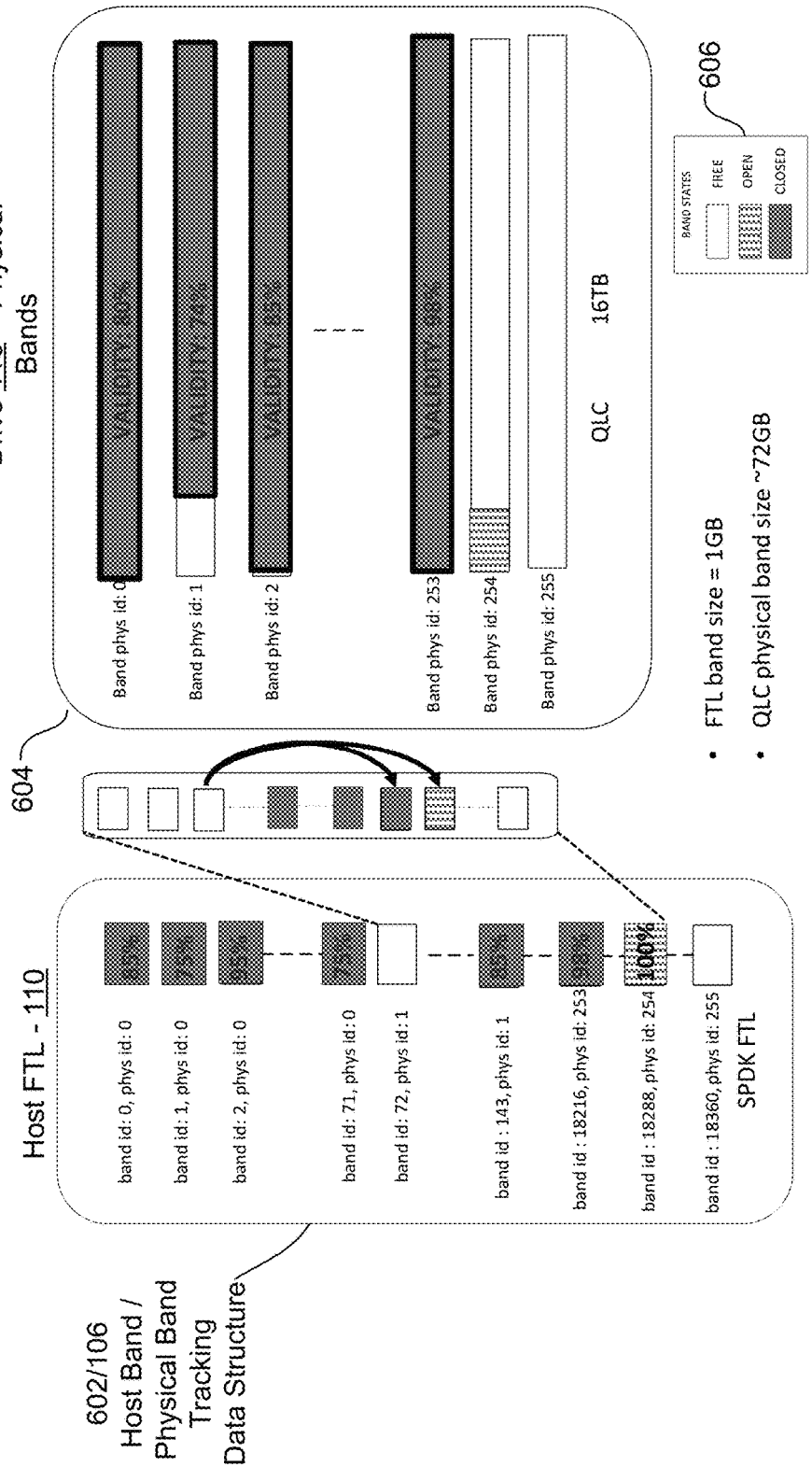
Figure 6L:
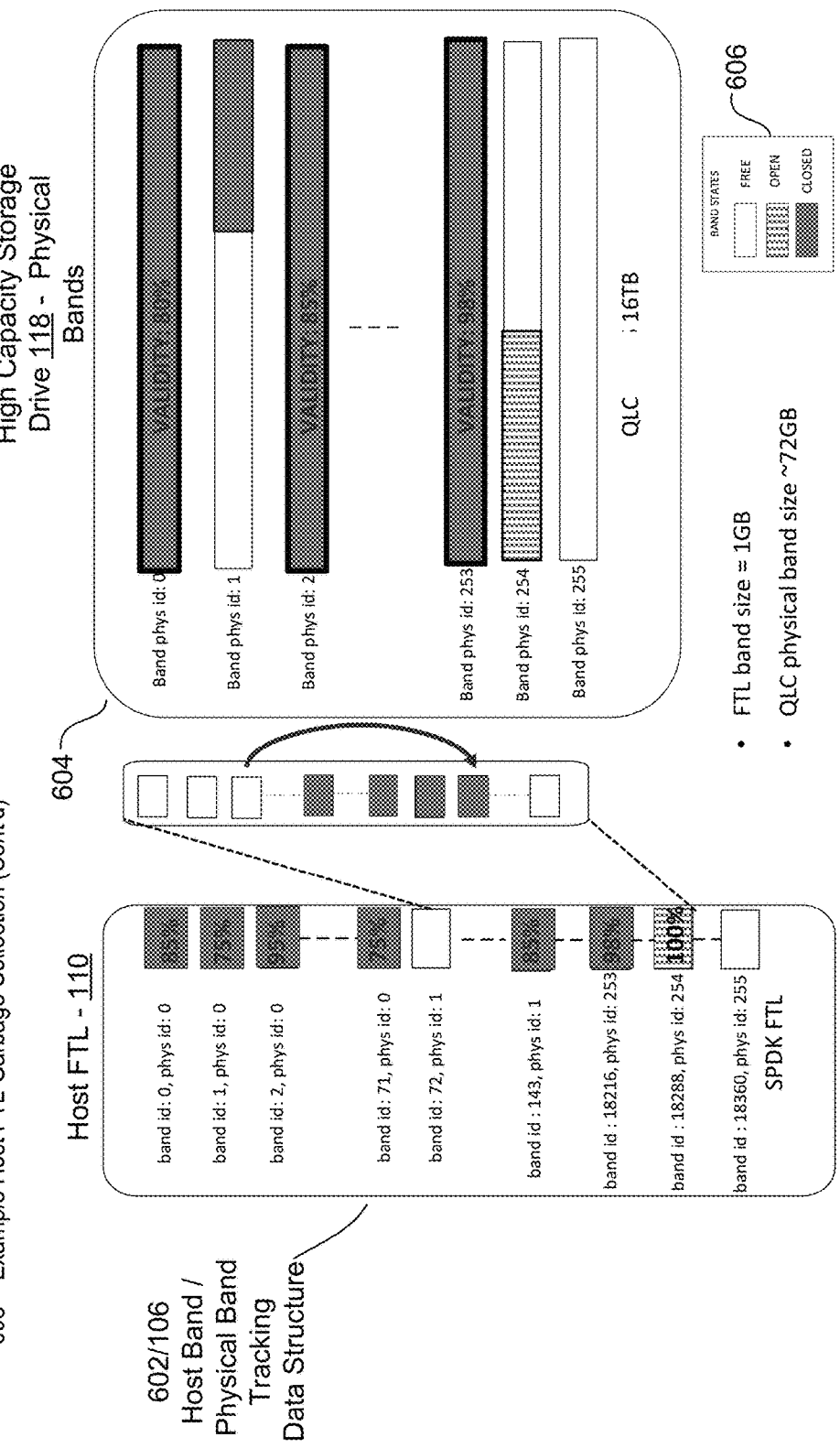
Figure 6M:
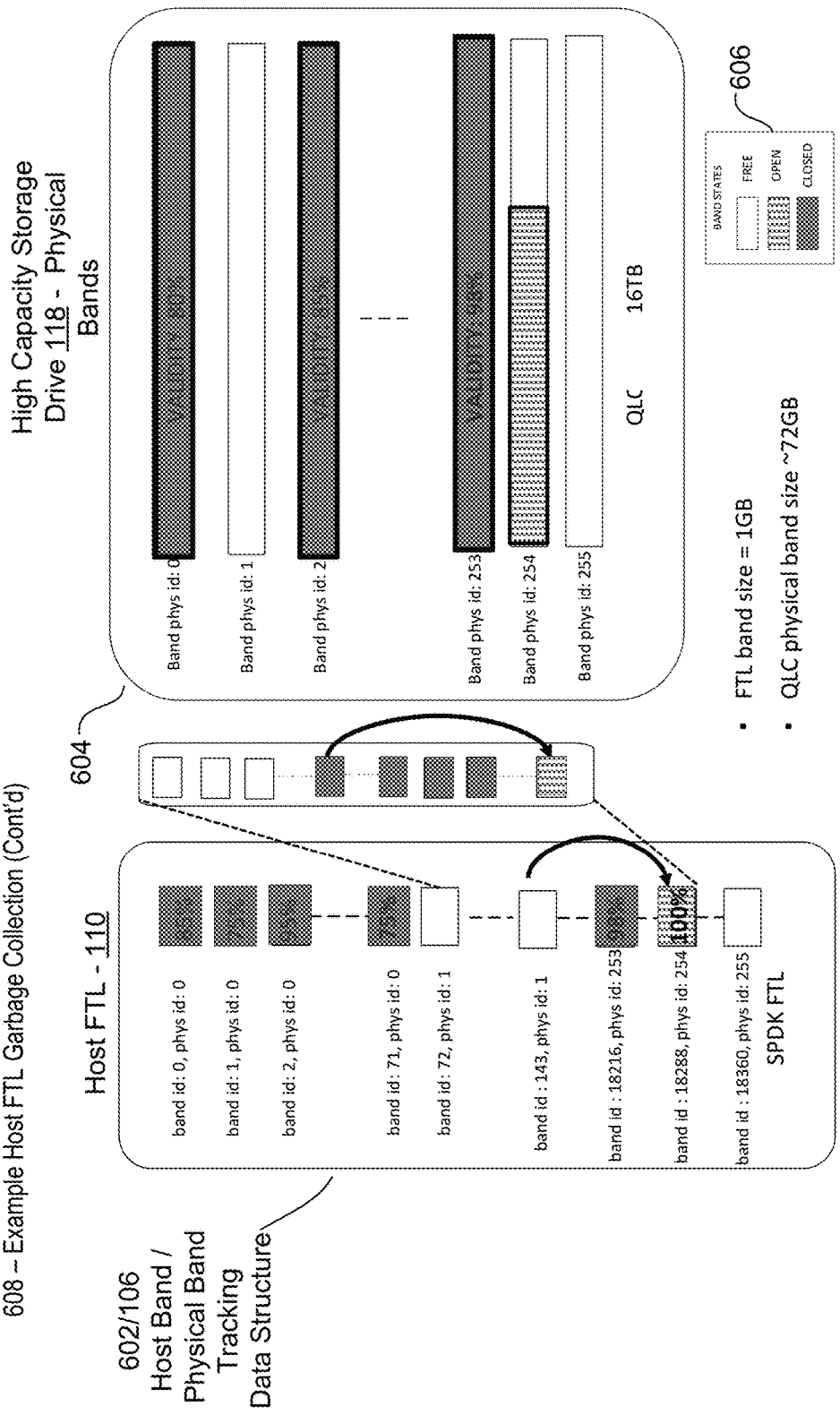

The ninth and tenth snapshots in FIGS. 6I and 6J illustrate the effect of the host FTL 110 moving host band 72 to the next available host band 18288 corresponding to the beginning of physical band 254, namely the freeing up of physical band 2. The eleventh and twelfth snapshots in FIGS. 6K and 6L illustrate the continued freeing up of physical band 2. After each move the host FTL 110 updates the host band statuses and validity levels to reflect the moves. Eventually, in the thirteenth snapshot in FIG. 6M, the physical band 2 is now entirely free, with any remaining invalid data that was not moved to a new host band having been trimmed by the host FTL 110. In this manner, the host FTL 110 is able to invalidate and free up an entire physical band on the high capacity NVM drive 118 without the involvement of the drive FTL 120, thereby eliminating write amplification at the drive FTL 120 level during garbage collection and defragmentation operations.

Figure 7:
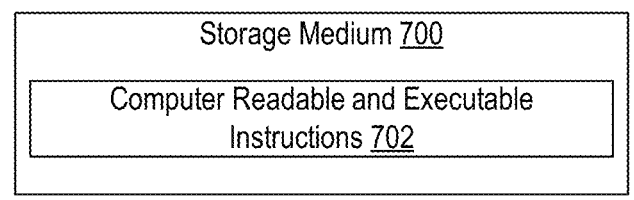
FIGS. 7-9 illustrate block diagrams of an example storage medium, storage device and computing platform that can be used to implement an embodiment of FTL synchronization.

FIG. 7 illustrates an embodiment of a storage medium 700. The storage medium 700 can include an article of manufacture. In some examples, storage medium 700 can include any non-transitory computer readable medium or machine readable medium, such as an optical, magnetic or semiconductor storage. Storage medium 700 can store various types of computer readable and executable instructions 702, such as instructions to implement the processes described herein. Examples of a computer readable or machine-readable storage medium can include any tangible media capable of storing electronic data, including volatile memory or non-volatile memory, removable or non-removable memory, erasable or non-erasable memory, writeable or re-writeable memory, and so forth. Examples of computer readable and executable instructions 702 can include any suitable type of code, such as source code, compiled code, interpreted code, executable code, static code, dynamic code, object-oriented code, visual code, and the like.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. The machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.).

Figure 8:
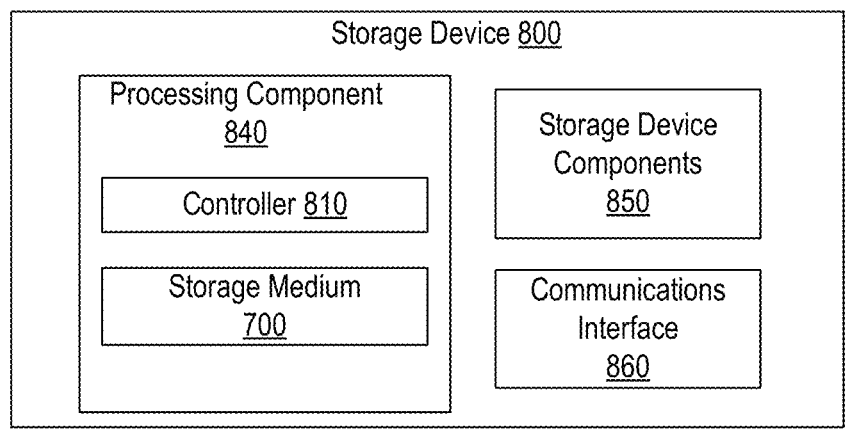

FIG. 8 illustrates an example storage device 800. In some examples, as shown in FIG. 8, storage device 800 can include a processing component 840, storage device components 850, and a communications interface 860, as well as host a storage medium 700. According to some examples, storage device 800 can be capable of being coupled to a host computing device or platform via the communications interface 860.

According to some examples, processing component 840 can execute processing operations or logic for a storage controller 810, or for other components 850 of the storage device and storage medium 700, and/or any activity described herein. Processing component 840 can include various hardware elements, firmware elements and software elements, or a combination of both.

In some examples, storage device components 850 can include common computing elements or circuitry, such as one or more processors, multi-core processors, co-processors, memory units, chipsets, controllers, interfaces, oscillators, timing devices, power supplies, and so forth. Examples of memory units can include without limitation various types of computer readable and/or machine-readable storage media any other type of volatile or non-volatile storage media suitable for storing information.

In some examples, communications interface 860 can include logic and/or features to support a communication interface. For these examples, communications interface 860 can include one or more communication interfaces that operate according to various communication protocols or standards to communicate over wired or wireless communication links. The communication interface 860 can include any mechanism that interfaces to any of a hardwired, wireless, optical, etc., medium to communicate to another device, such as a memory bus interface, a processor bus interface, an Internet connection, a disk controller, etc. The communication interface 860 can be configured by providing configuration parameters and/or sending signals to prepare the communication interface to provide a data signal describing the software content. The communication interface 860 can be accessed via one or more commands or signals sent to the communication interface.

Storage device 800 can be configured as an SSD for use in storage architecture 100 as shown in FIG. 1, including as a high performance NVM device 114 and/or a high capacity NVM device 118. Accordingly, functions and/or specific configurations of storage device 800 described herein, can be included or omitted in various embodiments of storage device 800, as suitably desired.

Figure 9:
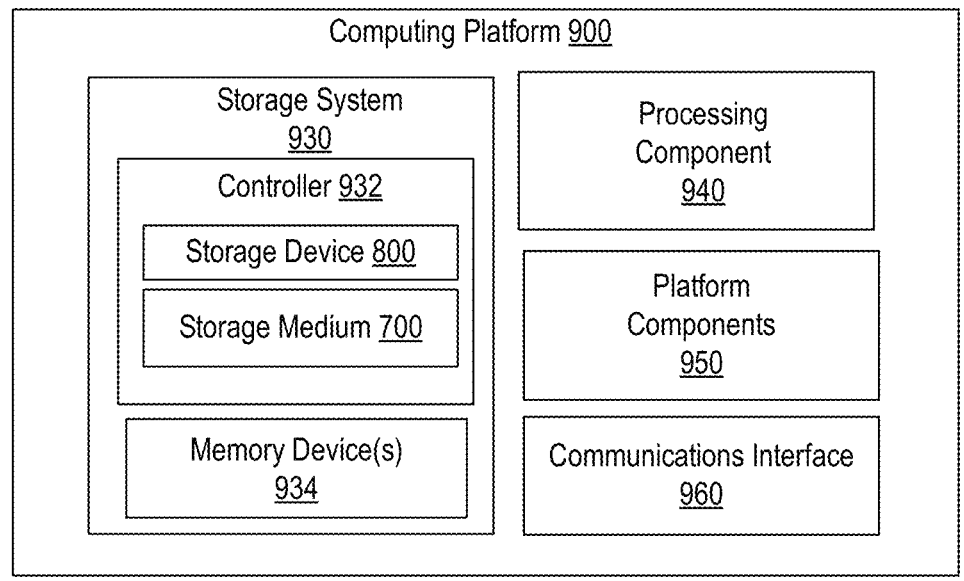

FIG. 9 illustrates an example computing platform 900. In some examples, as shown in FIG. 9, computing platform 900 can include one or more of: a storage system 930, a processing component 940, platform components 950, or a communications interface 960.

According to some examples, storage system 930 can be used in the storage architecture 100 as shown in FIG. 1 and includes a controller 932 and memory devices(s) 934. For these examples, logic and/or features resident at or located at controller 932 can execute at least some processing operations or logic for the storage medium 700, storage device 800, or any other activities described herein. Also, memory device(s) 934 can include volatile or non-volatile memory devices that are described above for storage architecture 100, including devices 114 and 118.

Non-volatile types of memory can be types of memory whose state is determinate even if power is interrupted to the device. In some examples, memory device(s) 934 can be block-addressable memory devices, such as memory devices including NAND or NOR technologies.

According to some examples, volatile types of memory included in memory device(s) 934 can include, but are not limited to, random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM). Volatile types of memory can be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

According to some examples, processing component 940 can include various hardware elements, firmware elements, software elements, or a combination thereof. In some examples, platform components 950 can include common computing elements, such as one or more processors, single or multi-cores, co-processors, memory units, chipsets, controllers, peripherals, interfaces, oscillators, timing devices, video cards, audio cards, multimedia I/O components (e.g., digital displays), power supplies, and so forth. Examples of memory units associated with either platform components 950 or storage system 930 can include without limitation, various types of computer readable and machine-readable storage media.

In some examples, communications interface 960 and communications interface 860, can include logic and/or features to support a communication interface. For these examples, communications interface 860/960 can include one or more communication interfaces that operate according to various communication protocols or standards to communicate over direct or network communication links. Direct communications can occur through a direct interface via use of communication protocols or standards described in one or more industry standards (including progenies and variants) such as those associated with the SMBus specification, the PCIe specification, the NVMe specification, the SATA specification, SAS specification or the USB specification.

Communications interface 860/960 can include radio frequency (RF) transceiver components for accessing wireless voice and/or data networks (e.g., using cellular telephone technology, data network technology such as 3G, 4G/LTE, Wi Fi, other IEEE 802.11 family standards, or other mobile communication technologies, or any combination thereof), components for short range wireless communication (e.g., using Bluetooth and/or Bluetooth LE standards, NFC, etc.), and/or other components. In some embodiments, communications interface 860/960 can provide wired network connectivity (e.g., Ethernet) in addition to or instead of a wireless interface. Communications interface 860/960 can be implemented using a combination of hardware (e.g., driver circuits, antennas, modulators/demodulators, encoders/decoders, and other analog and/or digital signal processing circuits) and software components. In some embodiments, communications interface 860/960 can support multiple communication channels concurrently or at different times, using the same transport or different transports.

Computing platform 900 can be part of a computing device that can be, for example, user equipment, a computer, a personal computer (PC), a desktop computer, a laptop computer, a notebook computer, a netbook computer, a tablet, a smart phone, virtual reality or augment reality device, autonomous driving or flying vehicle, Internet-of-things (IoT) device, embedded electronics, a gaming console, a server, a server array or server farm, a web server, a network server, a proxy device, a work station, a minicomputer, a main frame computer, a supercomputer, a network appliance, a web appliance, a distributed computing system, multiprocessor systems, processor-based systems, or combination thereof. Accordingly, functions and/or specific configurations of computing platform 900 described herein, can be included or omitted in various embodiments of computing platform 900, as suitably desired.

The components and features of computing platform 900 can be implemented using any combination of discrete circuitry, ASICs, field programmable gate arrays (FPGAs), logic gates and/or single chip architectures. Further, the features of computing platform 900 can be implemented using microcontrollers, programmable logic arrays and/or microprocessors or any combination of the foregoing where suitably appropriate. It is noted that hardware, firmware and/or software elements can be collectively or individually referred to herein as "logic," "circuit" or "circuitry."

Additional example implementations are as follows:

Example 1 is a method, system, apparatus or computer-readable medium for flash translation layer (FTL) synchronization comprising a processor of a host device to execute a logic for a host FTL to manage data written to physical bands of a storage drive having a drive FTL, the logic including mapping a host band in which data is managed to a physical band where the data is stored, tracking a validity level for the host band representing how much of the data managed in the host band is valid, and optimizing defragmentation operations applied to the physical band by the host FTL based on tracking the validity level.

Example 2 is the method, system, apparatus or computer-readable medium of Example 1 in which tracking the validity level is based on how much of the data managed in the host band is marked as valid in a logical-to-physical (L2P) table maintained in the host device.

Example 3 is the method, system, apparatus or computer-readable medium of any of Examples 1 and 2 in which the logic further includes receiving, in the host device, a notification from the storage drive when physical bands are opened and mapping the host band in which the data is managed to an open physical band where the data is stored.

Example 4 is the method, system, apparatus or computer-readable medium of any of Examples 1, 2 and 3 in which the logic further includes maintaining a host band state for the host band mapped to the physical band including updating the host band state to any of: FREE to indicate that the host band is empty and available to receive more data, OPEN to indicate that the host band is available to receive more data and CLOSED to indicate that the host band is any of full and not available to receive more data.

Example 5 is the method, system, apparatus or computer-readable medium of any of Examples 1, 2, 3 and 4 in which the logic for tracking the validity level further includes: determining a group of host bands mapped to a same physical band, computing an average validity level based on an average of the validity level tracked for each host band in the group of host bands, and using the average validity level to represent a physical band validity level of the same physical band to which the group of host bands are mapped.

Example 6 is the method, system, apparatus or computer-readable medium of any of Examples 1, 2, 3, 4 and 5, in which the logic for optimizing defragmentation operations applied to the physical band by the host FTL based on tracking the validity level further includes: determining the average validity level is at or below a minimum validity level and removing all stored data from the same physical band to which the group of host bands are mapped, including: moving valid data to an available host band mapped to a different available physical band and trimming invalid data.

Example 7 is the method, system, apparatus or computer-readable medium of any of Examples 1, 2, 3, 4, 5 and 6, in which the host band represents a logical space for managing data written to the physical band, the logical space including any one or more blocks, zones and chunks.

Example 8 is a method, system, apparatus or computer-readable medium of any of Examples 1, 2, 3, 4, 5, 6 and 7 in which the logic for the host FTL is developed in accordance with a Storage Performance Development Kit (SPDK) FTL library.

Example 9 is a method, system, apparatus or computer-readable medium of any of Examples 1, 2, 3, 4, 5, 6, 7 and 8, further comprising a controller to perform the logic for the host FTL.

Example 10 is a method, system, apparatus or computer-readable medium for FTL synchronization comprising a non-volatile memory (NVM) storage drive and a processor of a host communicatively coupled to the NVM storage drive, in which the processor is to execute a host FTL to manage data in logical bands for storage in physical bands of the NVM storage drive, the host FTL to map a logical band of data in the host to a physical band in which the data is stored, track a validity level of the logical band indicating how much of the data managed in the logical band is valid, and perform garbage collection on the physical band based on a tracked validity level of one or more logical bands mapped to the physical band.

Example 11 is the method, system, apparatus or computer-readable medium of Example 10 in which the host FTL is further to: receive a notification from a drive FTL of the NVM storage drive when a physical band is opened and map a logical band of data in the host to an opened physical band in which the data is stored.

Example 12 is the method, system, apparatus or computer-readable medium of any of Example 10 and Example 11, in which the logical bands include any one or more of blocks, zones and chunks of a host-managed space and the host FTL is developed in accordance with a Storage Performance Development Kit (SPDK) FTL library.

Example 13 is the method, system, apparatus or computer-readable medium of any of Examples 10, 11 and 12 in which to track the validity level of the logical band the processor is further to: determine a group of logical bands mapped to a same physical band, compute an average validity level based on an average of the tracked validity level for each logical band in the group and use the average validity level to represent a physical band validity level of the same physical band to which the group is mapped.

Example 14 is the method, system, apparatus or computer-readable medium of any of Examples 10, 11, 12 and 13, in which to perform garbage collection on the physical band based on the tracked validity level the processor is further to: determine the average validity level is at or below a minimum validity level and remove all stored data from the same physical band to which the group of logical bands is mapped, including to move valid data to an available logical band mapped to a different available physical band and trim invalid data.

The appearances of the phrase "one example" or "an example" are not necessarily all referring to the same example or embodiment. Any aspect described herein can be combined with any other aspect or similar aspect described herein, regardless of whether the aspects are described with respect to the same figure or element.

Some examples can be described using the expression "coupled" and "connected" along with their derivatives. These terms are not necessarily intended as synonyms for each other. For example, descriptions using the terms "connected" and/or "coupled" can indicate that two or more elements are in direct physical or electrical contact with each other. The term "coupled," however, can also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events.

Disjunctive language such as the phrase "at least one of X, Y, or Z," unless specifically stated otherwise, is otherwise understood within the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method of comprising:
   in a processor of a host device to execute a logic for a host flash translation layer (FTL) to manage data written to physical bands of a storage drive having a drive FTL, the logic including:
   mapping a host band in which data is managed to a physical band where the data is stored;
   tracking a validity level for the host band representing how much of the data managed in the host band is valid;
   optimizing defragmentation operations applied to the physical band by the host FTL based on tracking the validity level;
   determining a group of host bands mapped to a same physical band;
   computing an average validity level based on an average of the validity level tracked for each host band in the group of host bands; and
   using the average validity level to represent a physical band validity level of the same physical band to which the group of host bands are mapped.

2. The computer-implemented method of claim 1, wherein tracking the validity level is based on how much of the data managed in the host band is marked as valid in a logical-to-physical (L2P) table maintained in the host device.

3. The computer-implemented method of claim 1, the logic further including:
   receiving, in the host device, a notification from the storage drive when physical bands are opened; and
   mapping the host band in which the data is managed to an open physical band where the data is stored.

4. The computer-implemented method of claim 1, the logic further including:
   maintaining a host band state for the host band mapped to the physical band including updating the host band state to any of:
   FREE to indicate that the host band is empty and available to receive more data;
   OPEN to indicate that the host band is available to receive more data; and
   CLOSED to indicate that the host band is any of full and not available to receive more data.

5. The computer-implemented method of claim 1, wherein the logic for optimizing defragmentation operations applied to the physical band by the host FTL based on tracking the validity level further includes:
   determining the average validity level is at or below a minimum validity level; and
   removing all stored data from the same physical band to which the group of host bands are mapped, including:
   moving valid data to an available host band mapped to a different available physical band, and
   trimming invalid data.

6. The computer-implemented method of claim 1, wherein the host band represents a logical space for managing data written to the physical band, the logical space including any one or more blocks, zones and chunks.

7. The computer-implemented method of claim 1, wherein the logic for the host FTL is developed in accordance with a Storage Performance Development Kit (SPDK) FTL library.

8. An apparatus comprising:
   a host having a host flash translation layer (FTL) to manage how data is written to a storage drive having a drive FTL;

a controller to perform the host FTL, including to:
map a host band in which data is managed to a physical band of the storage drive where the data is stored,
track a validity level for the host band representing how much of the data managed in the host band is valid, and
optimize defragmentation operations applied to the physical band by the host FTL based on a tracked validity level for the host band; and
wherein to track the validity level, the controller further to:
determine a group of host bands mapped to a same physical band,
compute an average validity level based on an average of the tracked validity level for each host band in the group of host bands, and
use the average validity level to represent a physical band validity level of the same physical band to which the group of host bands are mapped.

9. The apparatus as in claim 8, wherein the tracked validity level is based on how much of the data managed in the host band is marked as valid in a logical-to-physical (L2P) table maintained in the host.

10. The apparatus as in claim 8, wherein to perform the host FTL the controller further to:
receive, at the host, a notification from the storage drive when physical bands are opened;
map the host band in which data is managed to an open physical band where the data is stored; and
maintain a host band state for the host band mapped to the physical band including to update the host band state to any of:
FREE to indicate that the host band is empty and available to receive more data,
OPEN to indicate that the host band is available to receive more data, and
CLOSED to indicate that the host band is any of full and not available to receive more data.

11. The apparatus as in claim 8, wherein the host band represents a logical space for managing data written to the physical band, the logical space including any one or more blocks, zones and chunks.

12. The apparatus as in claim 8, wherein the host FTL is developed in accordance with a Storage Performance Development Kit (SPDK) FTL library.

13. The apparatus as in claim 8, wherein to optimize defragmentation operations applied to the physical band by the host FTL the controller further to:
determine the average validity level is at or below a minimum validity level; and
remove all stored data from the same physical band to which the group of host bands are mapped, including:
to move valid data to an available host band mapped to a different available physical band, and
to trim invalid data.

14. A system comprising:
a non-volatile memory (NVM) storage drive;
a processor of a host communicatively coupled to the NVM storage drive, the processor to execute a host flash translation layer (FTL) to manage data in logical bands for storage in physical bands of the NVM storage drive, the host FTL to:
map a logical band of data in the host to a physical band in which the data is stored, track a validity level of the logical band indicating how much of the data managed in the logical band is valid, and
perform garbage collection on the physical band based on a tracked validity level of one or more logical bands mapped to the physical band; and
wherein to track the validity level of the logical band the processor is further to:
determine a group of logical bands mapped to a same physical band,
compute an average validity level based on an average of the tracked validity level for each logical band in the group, and
use the average validity level to represent a physical band validity level of the same physical band to which the group is mapped.

15. The system as in claim 14, the host FTL further to:
receive a notification from a drive FTL of the NVM storage drive when a physical band is opened; and
map a logical band of data in the host to an opened physical band in which the data is stored.

16. The system as in claim 14, wherein:
the logical bands include any one or more of blocks, zones and chunks of a host-managed space; and
the host FTL is developed in accordance with a Storage Performance Development Kit (SPDK) FTL library.

17. The system as in claim 14, wherein to perform garbage collection on the physical band based on the tracked validity level, the processor is further to:
determine the average validity level is at or below a minimum validity level; and
remove all stored data from the same physical band to which the group of logical bands is mapped, including:
moving valid data to an available logical band mapped to a different available physical band, and
trimming invalid data.

* * * * *